(12) United States Patent
Talon et al.

(10) Patent No.: US 12,440,057 B2
(45) Date of Patent: Oct. 14, 2025

(54) BEVERAGE PREPARATION MACHINE

(71) Applicant: SOCIETE DES PRODUITS NESTLE S.A., Vevey (CH)

(72) Inventors: Christian Talon, Vufflens-le-Chateau (CH); Didier Vuagniaux, Gimel (CH)

(73) Assignee: Société des Produits Nestlé S.A., Vevey (CH)

( * ) Notice: Subject to any disclaimer, the term of this patent is extended or adjusted under 35 U.S.C. 154(b) by 777 days.

(21) Appl. No.: 17/756,823

(22) PCT Filed: Dec. 1, 2020

(86) PCT No.: PCT/EP2020/084068
§ 371 (c)(1),
(2) Date: Jun. 3, 2022

(87) PCT Pub. No.: WO2021/110652
PCT Pub. Date: Jun. 10, 2021

(65) Prior Publication Data
US 2023/0000279 A1    Jan. 5, 2023

(30) Foreign Application Priority Data

Dec. 4, 2019 (EP) .................................. 19213419

(51) Int. Cl.
*A47J 31/40* (2006.01)
*A47J 31/36* (2006.01)
*A47J 31/44* (2006.01)

(52) U.S. Cl.
CPC ......... *A47J 31/407* (2013.01); *A47J 31/3628* (2013.01); *A47J 31/3633* (2013.01); *A47J 31/4403* (2013.01)

(58) Field of Classification Search
None
See application file for complete search history.

(56) References Cited

U.S. PATENT DOCUMENTS

| 2010/0116142 | A1 | 5/2010 | Versini |
| 2014/0338543 | A1* | 11/2014 | Smith ................. A47J 31/407 99/295 |
| 2019/0047782 | A1* | 2/2019 | Rehfuss ............. B65D 85/8067 |

FOREIGN PATENT DOCUMENTS

| CN | 102574632 A | 7/2012 |
| CN | 109641688 A | 4/2019 |

(Continued)

OTHER PUBLICATIONS

Russian Office Action for Appl No. 2022117138/03 dated Mar. 29, 2024.

*Primary Examiner* — John J Norton
(74) *Attorney, Agent, or Firm* — Thorpe North & Western, LLP

(57) ABSTRACT

Beverage preparation machines include a fluid circulation system including a fluid source, a fluid pump, and a fluid circulation conduit; a container holder to receive a corresponding container; and a fluid processing device including a fluid processing body including in turn at least one inlet member for introducing the fluid substance into the container for the preparation of a beverage product by mixing of the fluid substance with an ingredient contained in the container. In further detail, the fluid processing body can include at least one outlet member for dispensing the beverage product from the container and for separately moving the fluid processing device and the container relatively one to another, e.g., between a fluid introduction position (fluid processing body protrudes inside the internal volume of the container), and a beverage dispensing position (fluid processing body at least partially withdrawn from the internal volume of the container).

15 Claims, 24 Drawing Sheets

(56) References Cited

FOREIGN PATENT DOCUMENTS

| | | |
|---|---|---|
| EP | 2374733 | 10/2011 |
| JP | 2007503231 A | 2/2007 |
| JP | 2019506344 A | 3/2019 |
| JP | 2019523182 A | 8/2019 |
| RU | 2544812 C2 | 3/2015 |
| WO | 2017121796 | 7/2017 |
| WO | 2018007383 | 1/2018 |
| WO | 2019096830 A1 | 5/2019 |

\* cited by examiner

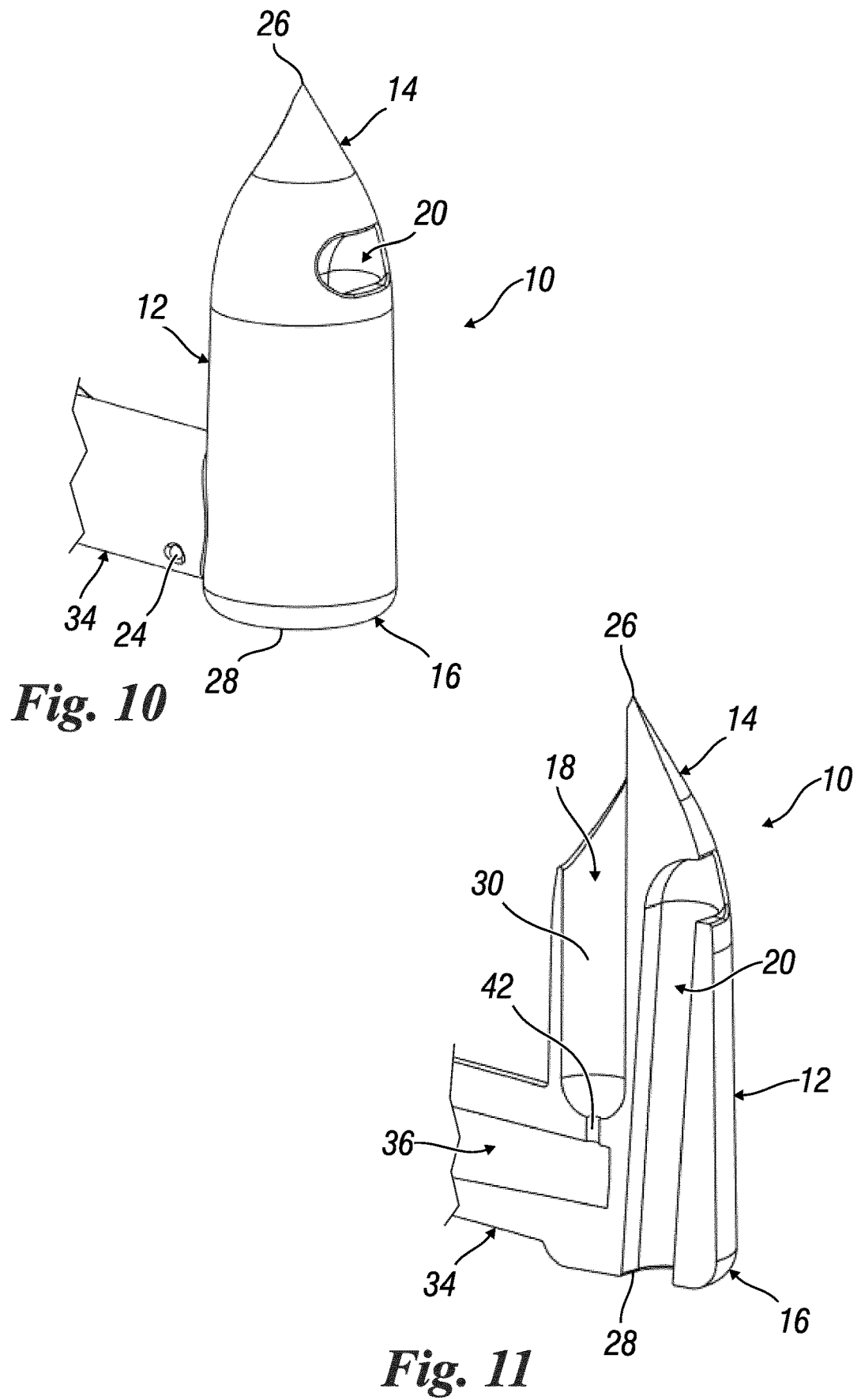

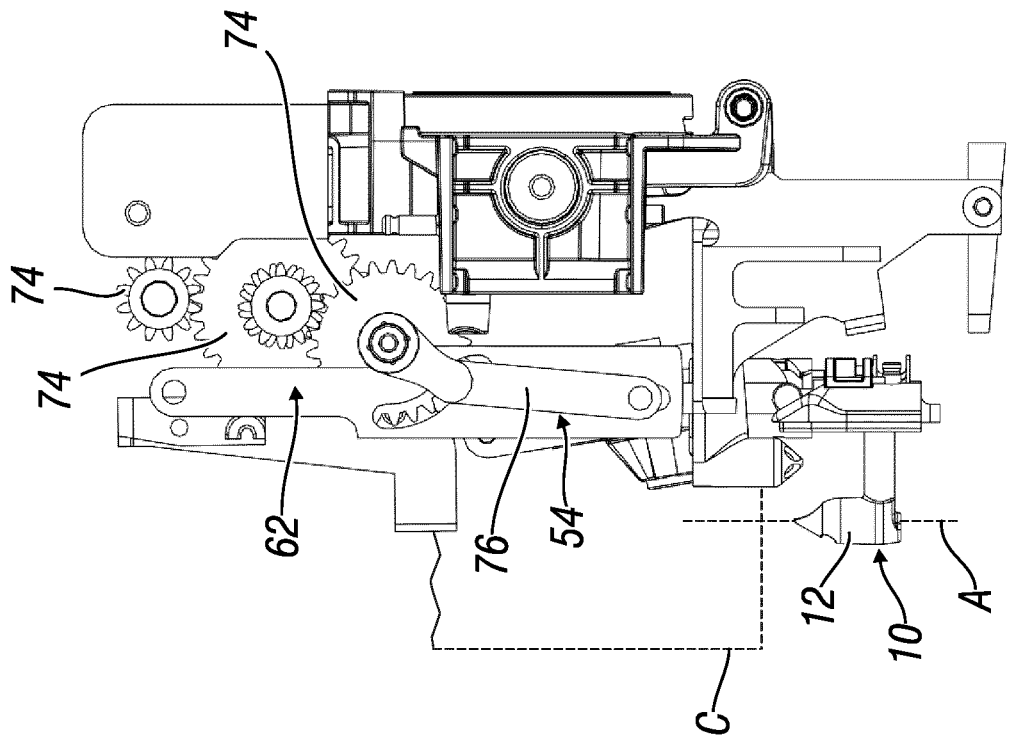
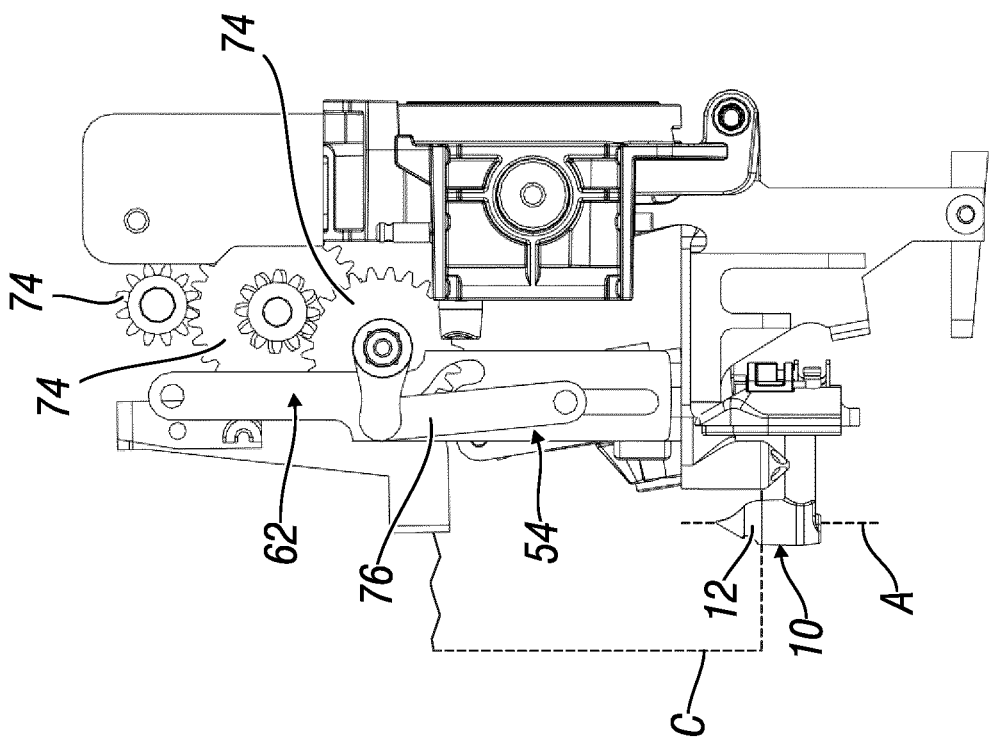

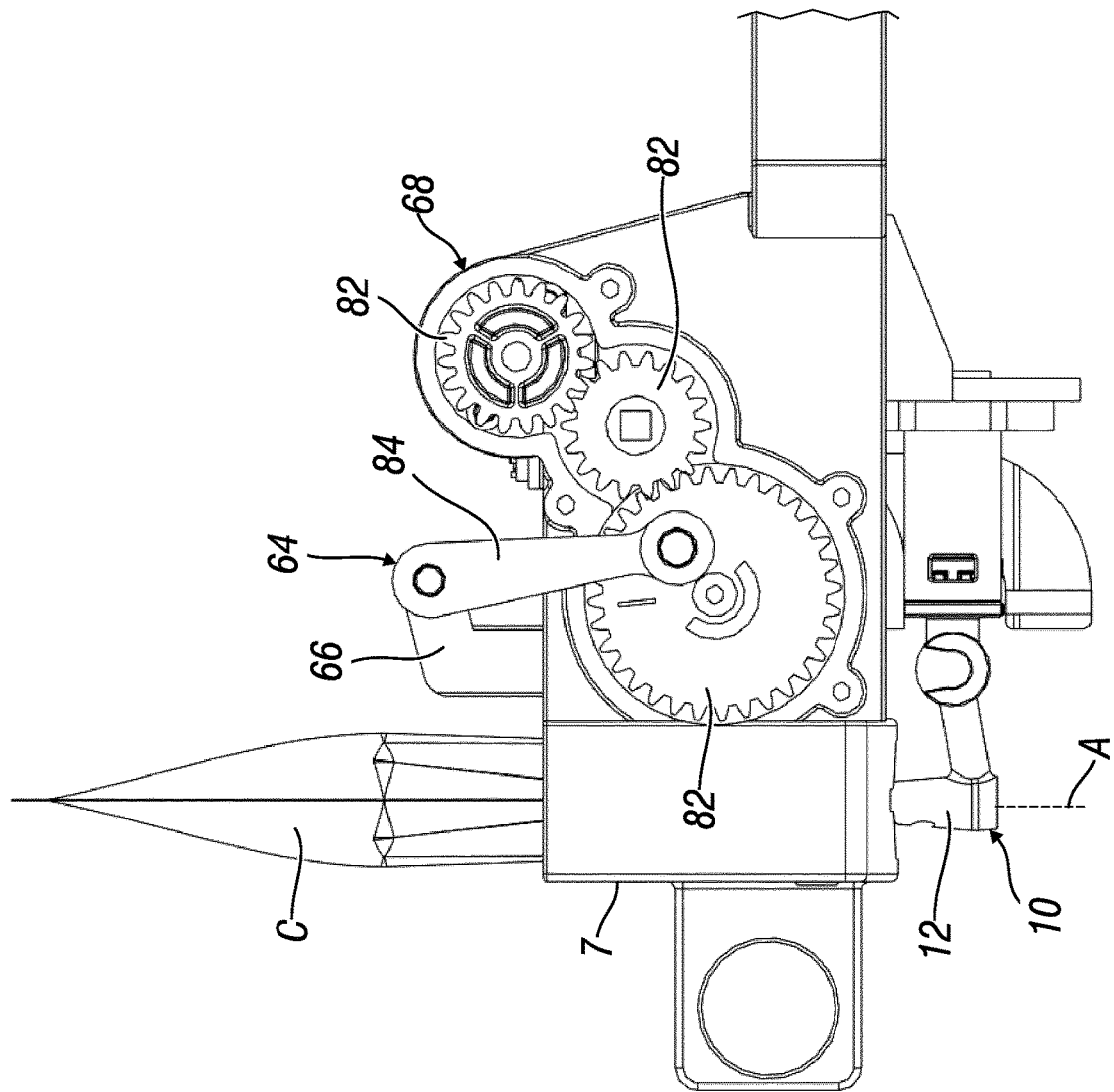

BEVERAGE PREPARATION MACHINE

CROSS REFERENCE TO RELATED APPLICATIONS

The present application is a National Stage of International Application No. PCT/EP2020/084068, filed on Dec. 1, 2020, which claims priority to European Patent Application No. 19213419.5, filed on Dec. 4, 2019, the entire contents of which are being incorporated herein by reference.

FIELD OF THE INVENTION

The present invention concerns a beverage preparation machine, particularly a machine for preparing a beverage product by mixing a fluid substance with an ingredient contained in a container, such as e.g. a sachet.

BACKGROUND OF THE INVENTION

All known systems for in-home preparation of beverages involve a machine that receives an ingredient storage container for storing an ingredient for the preparation of a beverage product. Generally, the ingredient container is introduced in the beverage preparation machine, and the machine passes a fluid (typically hot water) through a dose of the ingredient. The beverage product prepared by mixing the soluble ingredient and the fluid substance is then dispensed out of the container to a consumer receptacle (typically a cup).

Typically, the fluid passed from the beverage preparation machine to the container is introduced either by a shower plate that is in contact with a fluid permeable side of the container. Alternatively, the beverage preparation machine comprises a fluid processing device that pierces through an inlet wall of the container and injects the fluid therein (generally under a certain pressure). In such beverage preparation machines known in the art, dispensing of the beverage product from the container is performed either by:
  a) building a fluid pressure inside the closed cavity of the container until a dispensing wall of the container self opens and lets the beverage product out, or
  b) by piercing a dispensing wall of the container by a dispensing needle means (or other similar piercing means) of the beverage preparation machine, that is able to withdraw or let the beverage product out of the container vicinity.

In cases where the dispensing side of the container self opens, this can lead to variations in the pressure or manner of opening from one container to another, and to some undesirable variations in quality of the dispensed beverage product.

In cases where the beverage preparation machine comprises a dispensing needle means for piercing a dispensing wall of the container, the technology of adding this dispensing needle means in addition to the fluid processing device used for injecting the mixing fluid into the container, adds complexity and cost to the beverage preparation machine.

There is therefore a need for a beverage preparation machine which obviates the above cited drawbacks of existing beverage systems, and in particular is simpler and offers more reproducible quality from one beverage product to another, overtime.

SUMMARY OF THE INVENTION

The invention as claimed in claim 1 is a beverage preparation machine which comprises a fluid circulation system for a fluid substance, at least one container holder adapted for receiving a corresponding ingredient storage container and at least one fluid processing device which is part of the fluid circulation system. The fluid circulation system further comprises at least one fluid source, at least one fluid pump, at least one fluid circulation conduit and preferably also at least one fluid heating element. The fluid processing device comprises a fluid processing body comprising in turn at least one inlet means for introducing the fluid substance into the container for the preparation of a beverage product by mixing of the fluid substance with an ingredient contained in the container. The fluid processing body further comprises at least one outlet means, for dispensing the beverage product from the container.

At least one movement means is provided for separately moving the fluid processing device and the container relatively one to another between a fluid introduction position and a beverage dispensing position. In the fluid introduction position the fluid processing body protrudes inside the internal volume of the container for introducing therein the fluid substance. In the beverage dispensing position the fluid processing body is at least partially withdrawn from the internal volume of the container to allow complete dispensing of the beverage product from the container through the outlet means. Optionally, in the beverage dispensing position the fluid substance can be simultaneously introduced into the container by the fluid processing body when the beverage product is dispensed from the container.

It is to be noted that also in the fluid introduction position the fluid and/or the beverage may leak downwards on the outlet means of the fluid processing body.

Advantageously, the fluid processing body is a needle-shaped fluid processing body, comprising at least one end portion configured for perforating, and/or piercing, and/or tearing a specific portion or wall of the container before the introduction of the fluid substance into the container. Still advantageously, the fluid processing body further comprises at least one sealing means which:
  in the fluid introduction position, is engaged with the container to at least partially or totally block dispensing of the fluid substance and/or beverage product from the container and,
  in the beverage dispensing position, is not engaged with the container to allow complete dispensing of the beverage product from the container.

In a preferred embodiment of the invention, the fluid processing body further comprises:
  an inlet portion, wherein the inlet means for introducing the fluid substance into the container are provided at said inlet portion;
  an outlet portion, wherein the outlet means for dispensing the beverage product from the container are provided at said outlet portion;
  a first end portion which is provided at the inlet portion of the fluid processing body and which is configured for opening a portion or wall of the container;
  a second end portion which is provided at the outlet portion of the fluid processing body; and
  at least one first inlet conduit arranged within the fluid processing body and in fluid communication with the first end portion and with a second inlet conduit of the fluid processing device.

In this preferred embodiment of the invention, the inlet means and the outlet means are separate one to another. The inlet means comprises the first inlet conduit and the first end portion of the fluid processing body, whereas the outlet means comprises the second end portion of the fluid processing body.

In this preferred embodiment of the invention, the outlet means comprises at least one outlet conduit which is distinct from the inlet conduit, which is provided on the outer surface of the fluid processing body and which is in fluid communication with the second end portion of the fluid processing body.

Advantageously, the fluid processing device further comprises at least one air or gas inlet bore which is in fluid communication with the inlet means. The movement means are thus configured for separately moving the fluid processing device and the container relatively one to another in at least one of the following positions:

a first intermediate position, wherein the air or gas inlet bore is located outside the internal volume of the container and the sealing means are not engaged with the container, and a second intermediate position, wherein the air or gas inlet bore is located inside the internal volume of the container and the sealing means are still not engaged with the container. According to one preferred embodiment, the beverage preparation machine comprises first locking means for selectively locking/unlocking the container with respect to the container holder when the container is received into the container holder, whereas the container holder is fixed with respect to the fluid processing device. The movement means comprise first actuation means for moving the fluid processing device with respect to the container between at least the fluid introduction position and the beverage dispensing position and vice versa. Preferably, the first locking means comprise a first gear and/or leverage mechanism which is movable with respect to a fixed portion of the beverage preparation machine and which is provided with at least one tooth selectively engageable with at least one corresponding hole provided in the container, wherein the container is detachable from the container holder, and thus from the beverage preparation machine, in the non-engaged position of each tooth with respect to the corresponding hole. Always preferably, the first actuation means comprise a second gear and/or leverage mechanism connected to the fluid processing device, wherein the second gear and/or leverage mechanism is configured for moving the fluid processing device with respect to the container along a vertical axis.

According to another preferred embodiment, the movement means comprise second actuation means for moving the container with respect to the fluid processing device between the fluid introduction position and the beverage dispensing position and vice versa, whereas the fluid processing device is fixed with respect to the container holder. Preferably, the second actuation means comprise a container support device and a third gear and/or leverage mechanism. The container support device is actuated by the third gear and/or leverage mechanism for moving the container with respect to the container holder and with respect to the fluid processing device along a vertical axis. Always preferably, the container support device is provided with second locking means comprising at least one pin selectively engageable with at least one corresponding hole provided in the container, wherein the container is detachable from the container holder, and thus from the beverage preparation machine, in the non-engaged position of each pin with respect to the corresponding hole.

According to a preferred aspect of the invention, the container is manufactured from a flexible material and is internally provided, at the portion thereof that is engaged by the fluid processing device, with an additional layer of a substantially rigid material. More preferably, the substantially rigid layer is provided, at the portion of the container that is engaged by the fluid processing device, with a hole having a cross-sectional shape that is compatible with the cross-sectional shape of the fluid processing body. This hole is closed by a predefined portion of the flexible material of the container in the non-operative condition of the fluid processing device. This hole is thus opened by the fluid processing body in its fluid introduction position.

Preferably, in the beverage dispensing position, the fluid substance is simultaneously introduced into the container by the fluid processing body when said beverage product is dispensed from said container, so as to mix with the fluid and the ingredient and produce a foamy beverage product when it is desired.

BRIEF DESCRIPTION OF THE DRAWINGS

Additional features and advantages of the present invention are described in, and will be apparent from, the description of the presently preferred embodiments, which are set out below with reference to the drawings in which:

FIG. 10 is a perspective view of another possible embodiment of a fluid processing device for a beverage preparation machine according to the present invention;

FIG. 11 is a cross-sectional view of the fluid processing device of FIG. 10;

FIGS. 16A-16B show, in side view, a preferred embodiment of the actuation means for moving the fluid processing device with respect to the container between the fluid introduction position and the beverage dispensing position and vice versa;

FIGS. 17A-17B show, in side view, a preferred embodiment of the actuation means for moving the container with respect to its container holder and with respect to the fluid processing device between the fluid introduction position and the beverage dispensing position and vice versa.

DETAILED DESCRIPTION OF THE INVENTION

Figure 1:
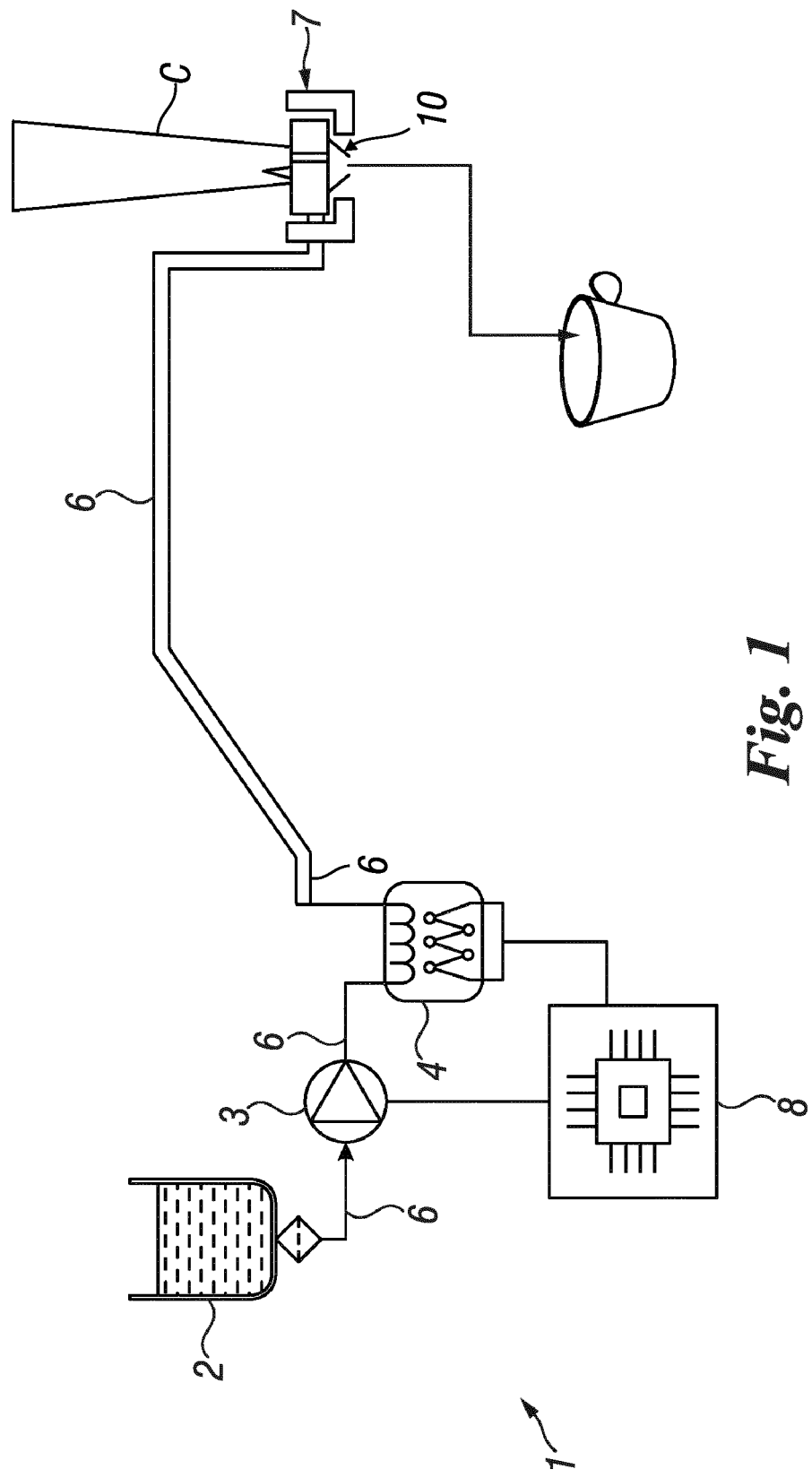
FIG. 1 is a schematic representation of a beverage preparation machine according to the present invention.

FIG. 1 illustrates schematically the layout of a beverage preparation machine according to an embodiment of the present invention.

The beverage preparation machine is indicated as a whole with reference numeral 1 and comprises a fluid circulation system for a fluid substance. The fluid substance is typically water, at cold state (between 4° C. and 20° C.), ambient state (between 20° C. and 35° C.) or hot state (between 35° C. and 95° C.). Preferably, the fluid substance is water at a temperature comprised between 40° C. and 90° C.

For example, the fluid circulation system preferably comprises at least one fluid source 2, at least one fluid pump 3 and at least one fluid circulation conduit 6. The fluid circulation system may also comprise at least one fluid heating element 4. Such fluid circulation systems are known in the art. The fluid source 2 can be, for example, a detachable water reservoir that is connected to the fluid circulation system. Alternative fluid sources could comprise, for example, tap-water connections, a non-water edible fluid canister or a water-bottle connection. The fluid pump 3 can be, for example, a standard piston pump delivering a maximum output pressure of 20 bar. Obviously, alternative fluid pumps could be provided.

The beverage preparation machine 1 comprises at least one container holder 7 adapted for receiving a corresponding container C. The container holder 7 is a mechanical element adapted for ensuring the static positioning of the container C within the beverage preparation machine 1, at least during the time it actually operates for preparing a beverage, so that the corresponding fluid circulation system can be connected to the container C in a functional manner for injecting the fluid substance therein or therethrough. These container holders are known in the art.

Figure 2:
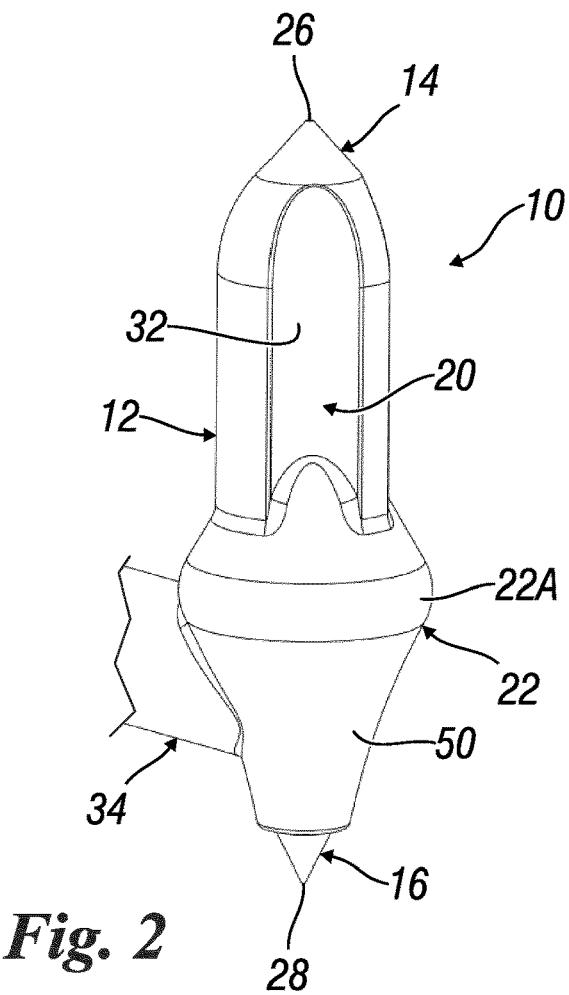
FIG. 2 is a perspective view of a first embodiment of a fluid processing device for the beverage preparation machine according to the present invention.
Figure 3:
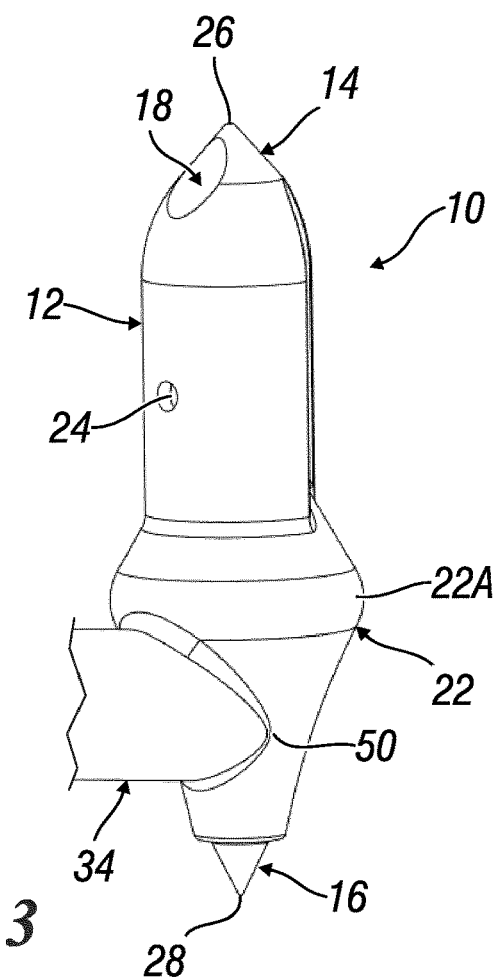
FIG. 3 is another perspective view of the fluid processing device of FIG. 2.
Figure 4:
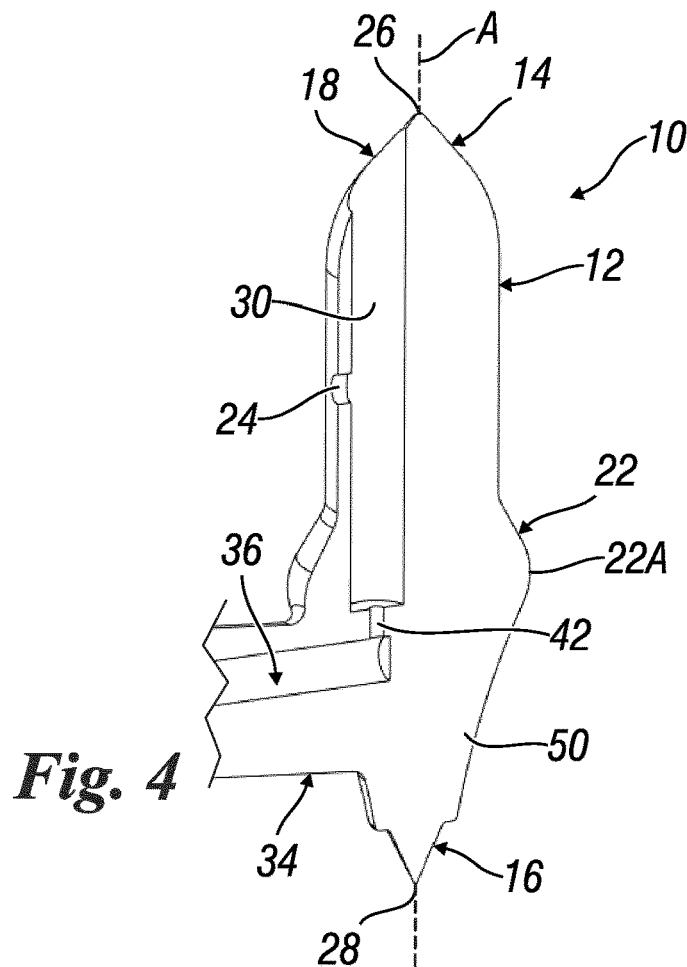
FIG. 4 is a cross-sectional view of the fluid processing device of FIG. 2.
Figure 5:
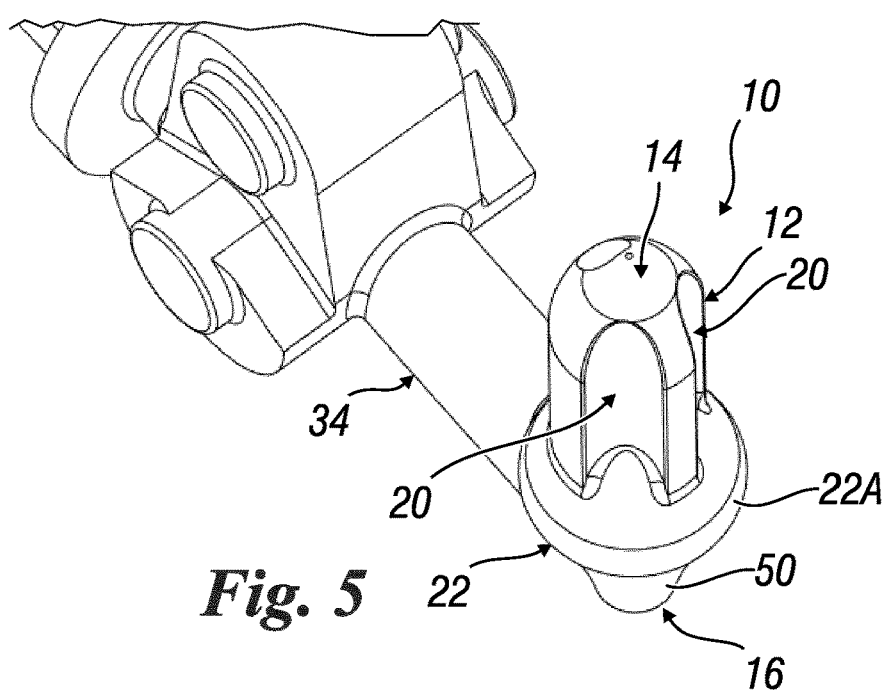
FIG. 5 is still another perspective view of the fluid processing device of FIG. 2, wherein further components of said fluid processing device are shown.

The beverage preparation machine 1 further comprises at least one fluid processing device 10 which is part of the fluid circulation system and which comprises a fluid processing body 12 (FIG. 2). The fluid processing body 12 comprises in turn at least one inlet means 18 for introducing the fluid substance into the container C for the preparation of a beverage product. Preferably, the fluid processing body 12 is a needle-shaped fluid processing body 12. With the term "needle-shaped" it should be intended that the fluid processing body 12 comprises at least one end portion 26, 28 configured for perforating, and/or piercing, and/or tearing a specific portion or wall of the container C before the introduction of the fluid substance into said container C. The fluid processing body 12 is shaped in such a way as to be able to at least partially penetrate in the container C.

The preparation of the beverage product is obtained by mixing of the fluid substance with an ingredient contained in the container C. Preferably, the ingredients are chosen within the list of roast and ground coffee, compacted or not, soluble powder coffee or leaf tea. Dairy ingredients (e.g. milk or creamer) could also be provided, as well as chocolate, fruit juices, soups, vegetable juices, bouillons, smoothies, purees, coulis, creams or a combination thereof, in powdered soluble form, liquid concentrated form having various viscosities or in gel form. With the expression "mixing of the fluid substance with an ingredient" it should be intended that all the ingredients contained in the container C are in a form which is compatible with a generic mixing operation (dissolution, extraction or infusion) with the fluid substance (typically water) to obtain the beverage product.

According to the invention, the needle-shaped fluid processing body 12 of the fluid processing device 10 comprises at least one outlet means 20 for dispensing the beverage product from the container C. The beverage preparation machine 1 is provided with at least one movement means 54, 64 for separately moving the fluid processing device 10 and the container C relatively one to another between:

a fluid introduction position, wherein the needle-shaped fluid processing body 12 protrudes inside the internal volume of the container C for introducing therein the fluid substance, and a beverage dispensing position, wherein the needle-shaped fluid processing body 12 is at least partially withdrawn from the internal volume of the container C to allow dispensing of the beverage product from the container C through the outlet means 20. Optionally, in the beverage dispensing position, the fluid substance can be simultaneously introduced into the container C by the needle-shaped fluid processing body 12 when the beverage product is dispensed from the container C. Optionally, during the fluid introduction position the fluid substance and/or the beverage product may partially leak downwards on the outlet means 20 of the fluid processing body 12.

Figure 7A:
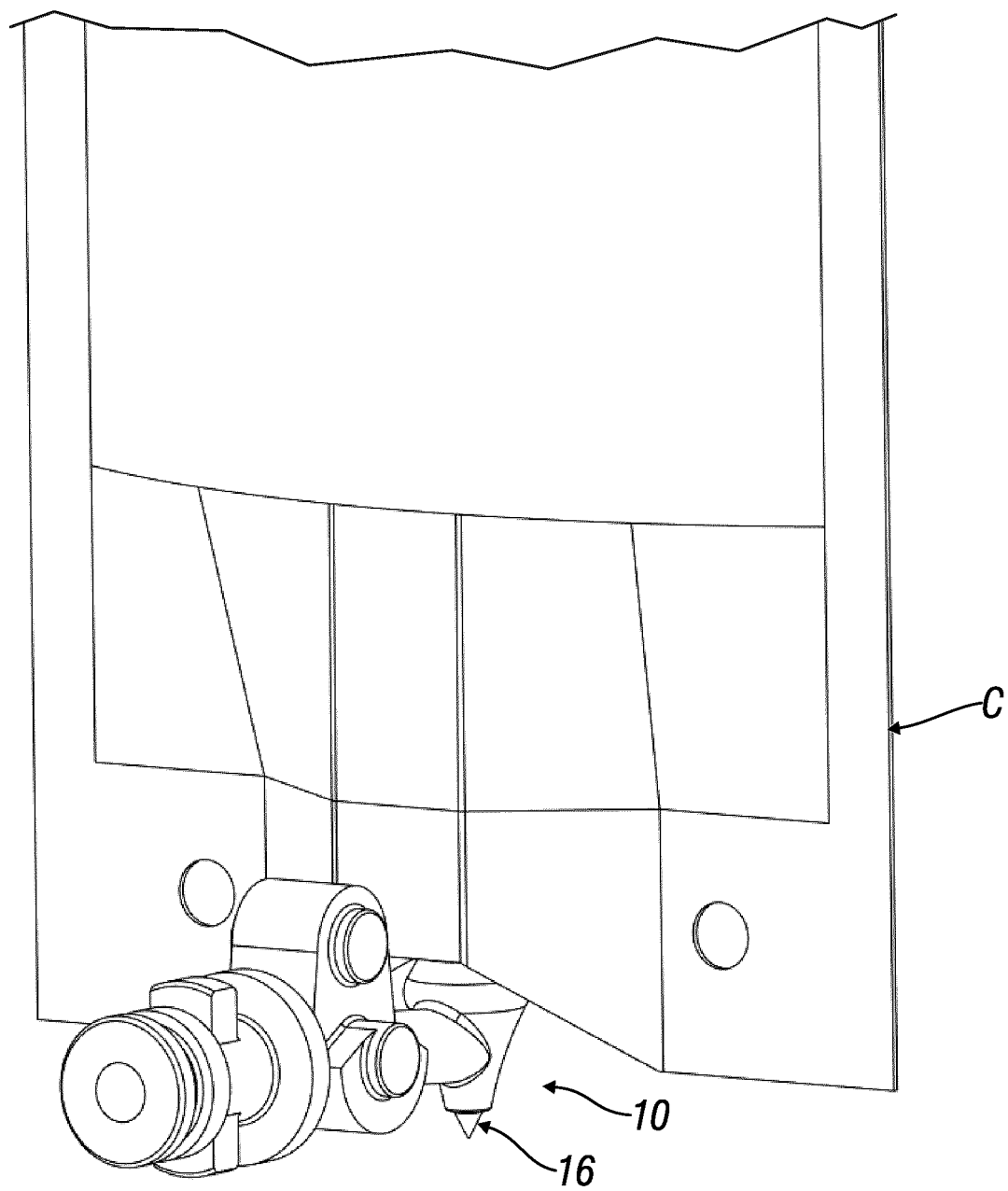
FIGS. 7A-7C show, in a first perspective view, in a cross-sectional view and in a second perspective view respectively, the fluid processing device of FIG. 2 in a first operative position, i.e. the fluid introduction position, wherein said fluid processing device protrudes inside the ingredient storage container in a sealing manner, such that the fluid can be introduced into the ingredient storage container and no leakage of this fluid outside said container is allowed.
Figure 7B:
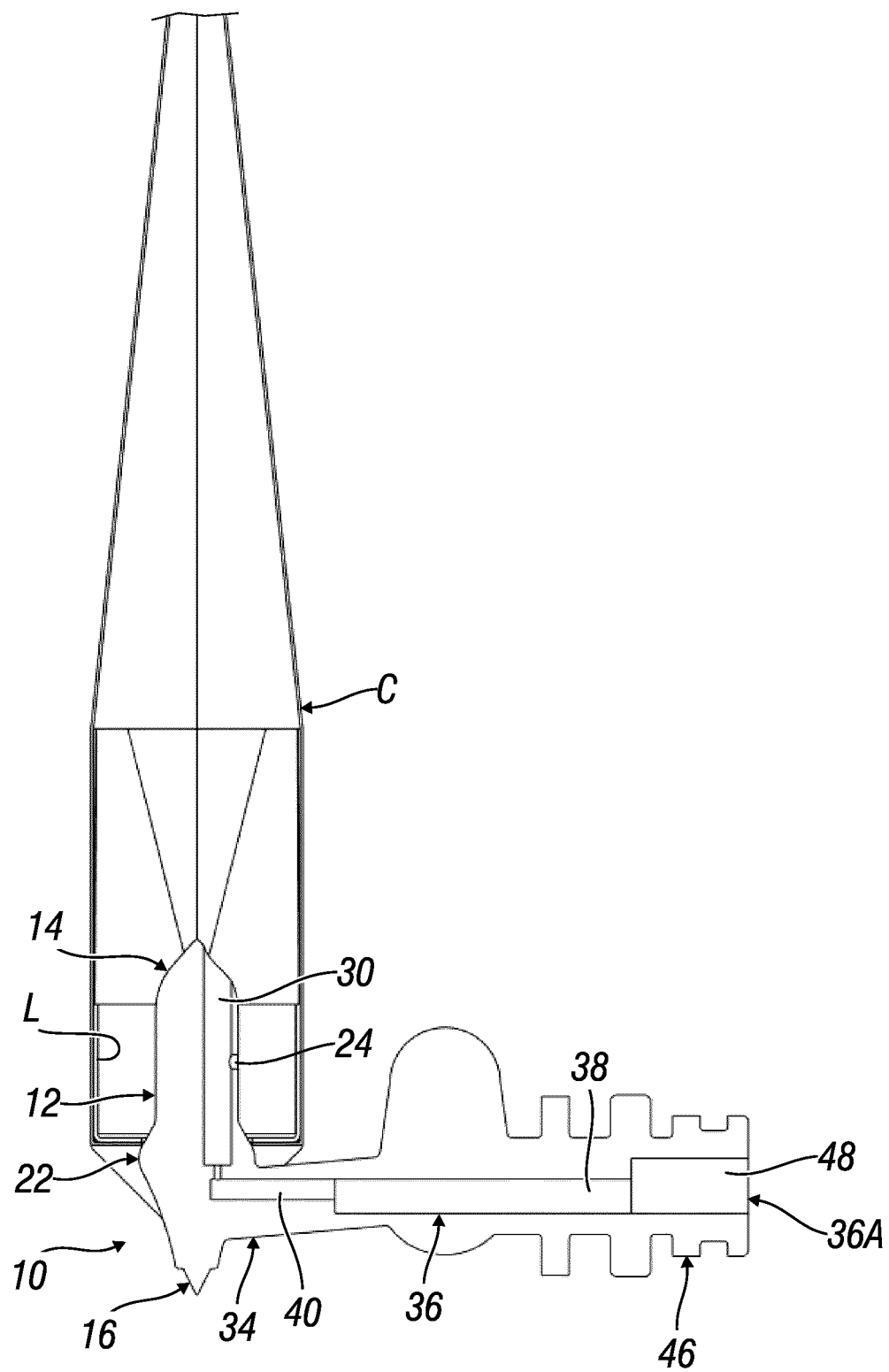
Figure 7C:
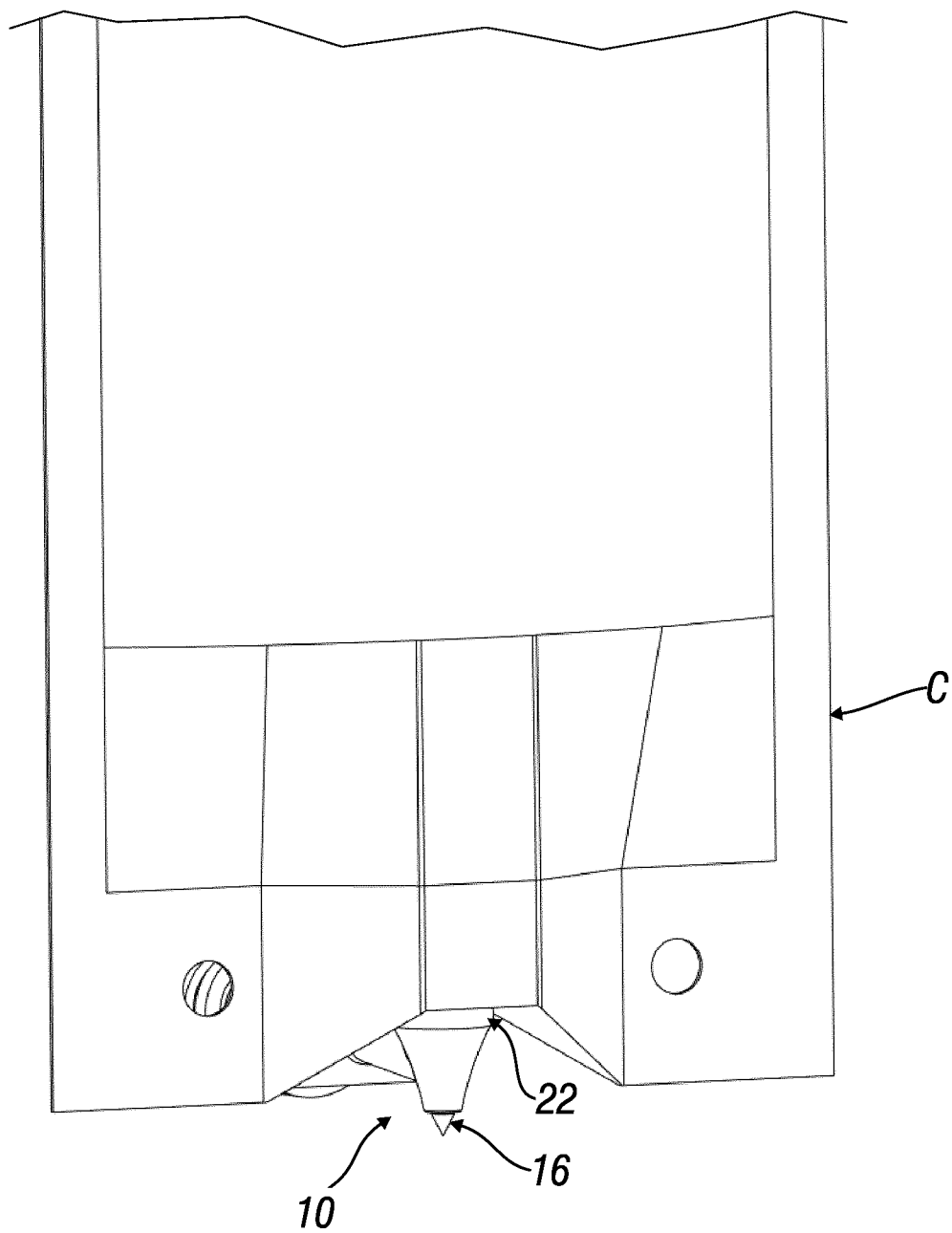

According to a preferred aspect of the invention, the needle-shaped fluid processing body 12 further comprises at least one sealing means 22 to be engaged with the container C for preventing leakage of the fluid substance and/or the beverage product from the container C at least when the fluid substance is introduced into the container C. In other words, in case of the needle-shaped fluid processing body 12 is provided with sealing means 22, in the fluid introduction position these sealing means 22 are engaged with the container C to block dispensing of the fluid substance and/or beverage product from the container C (FIGS. 7A-7C). In the beverage dispensing position these sealing means 22 are not engaged with the container C to allow full dispensing of the beverage product from the container C (FIGS. 8A-9C). However, it should be noted that the sealing means 22 are not an essential feature of the invention.

According to the embodiment of the fluid processing device 10 shown in FIGS. 2-9, the needle-shaped fluid processing body 12 comprises an inlet portion 14 and an outlet portion 16. The inlet means 18 for introducing the fluid substance into the container C are provided at the inlet portion 14 of the needle-shaped fluid processing body 12, whereas the outlet means 20 for dispensing the beverage product from the container C are provided at the outlet portion 16 of the needle-shaped fluid processing body 12. The inlet means 18 and the outlet means 20 of the needle-shaped fluid processing body 12 are preferably separate one to another and allow, with a single fluid processing device 10, both to introduce the mixing fluid substance (typically hot water) into the container C and to dispense the beverage product formed inside the container C.

Preferably, according to the embodiment of the fluid processing device 10 shown in FIGS. 2-9, the needle-shaped fluid processing body 12 comprises a first end portion 26, which is provided at the inlet portion 14 of said needle-shaped fluid processing body 12 and which is configured for opening (e.g. by tearing, piercing and/or perforating) a specific portion of the container C, and a second end portion 28, which is provided at the outlet portion 16 of said needle-shaped fluid processing body 12. The needle-shaped fluid processing body 12 further comprises at least one inlet conduit 30 arranged therein. The inlet conduit 30 is in fluid communication with the first end portion 26 of the needle-shaped fluid processing body 12 and with a second inlet conduit 36 of a second fluid processing body 34, as it will be described in detail hereinafter. The inlet conduit 30 and the first end portion 26 are thus comprised in the inlet means 18 of the needle-shaped fluid processing body 12. More precisely, the inlet conduit 30 is a closed conduit in the form of a tube, embedded in the needle-shaped fluid processing body 12, that allows the fluid substance to be inserted into the container C without being exposed to the air.

As shown in the embodiment of the fluid processing device 10 of FIGS. 2-9, the sealing means 22 are preferably provided between the first end portion 26 and the second end portion 28 of the needle-shaped fluid processing body 12. Preferably, the needle-shaped fluid processing body 12 is a vertically oriented elongated body, more preferably a point shaped body, wherein its first end portion 26, its second end portion 28 and the sealing means 22 are coaxially arranged about a vertical axis A. More preferably, as shown in the drawings, the first end portion 26 is upwardly oriented with respect to the position of the fluid processing device 10 within the beverage preparation machine 1. Even more preferably, the first end portion 26 and/or the second end portion 28 of the needle-shaped fluid processing body 12 are point shaped portions respectively. The point shaped first end portion 26 is thus configured for opening, e.g. by perforation, piercing or tearing, a specific portion of the container C to inject the fluid substance therein, as it will be explained in detail hereinafter. The point shaped second end portion 28 is downwardly oriented with respect to the position of the fluid processing device 10 in the beverage preparation machine 1, so as to precisely direct the flow of the beverage product into the user's cup.

The outlet means 20 of the fluid processing device 10 comprises the second end portion 28 of the needle-shaped fluid processing body 12 and at least one outlet conduit 32 which is distinct from the inlet conduit 30 of the inlet means 18. More specifically, according to the embodiment shown in FIGS. 2-9, each outlet conduit 32 is obtained in the form of a grooved channel provided on the outer surface of the needle-shaped fluid processing body 12. Each grooved channel is thus in fluid communication with the second end portion 28 of the needle-shaped fluid processing body 12.

Preferably the sealing means 22, that are configured to be engaged with the container C for preventing leakage of the fluid substance and/or the beverage product from said container C in the operative condition of the fluid processing device 10, consists of an enlarged portion 22A of the needle-shaped fluid processing body 12. More specifically, this enlarged portion 22A of the needle-shaped fluid processing body 12 is comprised between the first end portion 26 and the second end portion 28 of said needle-shaped fluid processing body 12 and has a cross-sectional area which is larger than any cross-sectional areas of the portion of said needle-shaped fluid processing body 12 comprised between its first end portion 26 and the enlarged portion 22A itself. This enlarged portion 22A of the fluid processing body 12 could be at least partially covered with an elastomeric material to ensure better sealing properties. This enlarged portion 22A of the needle-shaped fluid processing body 12 is thus configured for adhering against a wall of the container C at the portion of said container C opened by the first end portion 26 of the needle-shaped fluid processing body 12.

Conveniently, each outlet conduit 32 in the form of a grooved channel is provided on the outer surface of the vertically oriented needle-shaped fluid processing body 12, in a portion thereof comprised between its first end portion 26 and its enlarged portion 22A. A beverage guiding element 50 for guiding the beverage to the second end portion 28 of the needle-shaped fluid processing body 12 is thus provided between the enlarged portion 22A and said second end portion 28. Preferably, the beverage guiding element 50 has a tapered cross-sectional area which decreases from the enlarged portion 22A to the second end portion 28 of the needle-shaped fluid processing body 12. More preferably, the beverage guiding element 50 has a cone-shape. Even more preferably, the beverage guiding element 50 a truncated cone-shape, with an additional pointed element at the outlet portion 16. The beverage product extracted from the container C is thus guided by the outlet conduit 32 to the second end portion 28 through the beverage guiding element 50, so as to precisely direct the flow of this beverage product into the user's cup placed below said beverage guiding element 50.

The fact that the outlet means 20 of the fluid processing device 10 are placed externally with respect to the needle-shaped fluid processing body 12, together with the fact that said outlet means 20 are obtained in the form of grooved channels, i.e. with an open cross section instead of a closed-loop cross section (which is typical of conventional cylindrical channels), leads to a specific advantage in processing beverage products based on a mixture of a fluid substance and a soluble ingredient. Actually, if the soluble ingredient contained in the container C mostly consist of solid particles, some of these solid particles (e.g. biscuit bits, etc.) remain in their solid state even after the mixing with the fluid substance (e.g. hot water), so as to be properly ingested by the user. Therefore, the open cross section of the outlet means 20 allows these particles to pass, together with the fluid substance, into the user's cup, without the risk of blocking an otherwise designed dispensing cylindrical channel.

Additionally, the grooved channels could have a variable open cross section, which increases or decreases from the first end portion 26 to the enlarged portion 22A of the needle-shaped fluid processing body 12. In other words, the grooved channels can be optionally manufactured with a specific profile (i.e. ramp) from their top to their bottom so that, depending on the height position of the needle-shaped fluid processing body 12 into the container C, the open cross section of grooved channels increases or decreases to adapt the flow rate of the beverage product going out to the cup, and also the fluid pressure inside the container C during mixing.

Optionally, the fluid processing device 10 could be provided with at least one air or gas inlet bore 24, which is in fluid communication with the inlet means 18 and which, in the embodiment of FIGS. 2-9, is located on the needle-shaped fluid processing body 12 between the first end portion 26 and the sealing means 22. According to the embodiment shown in FIGS. 2-9, the air or gas inlet bore 24 is in the form of a through hole obtained on a side wall of the needle-shaped fluid processing body 12 and is placed in fluid communication with the inlet conduit 30 for the fluid adduction. As it will be explained in detail hereinafter, the air or gas inlet bore 24 allows the inlet conduit 30 to be in contact with the outer environment in certain operation conditions of the fluid processing device 10 and allows the aspiration of a predefined amount of air or gas, to be mixed with the fluid substance and to be introduced into the container C through the inlet conduit 30, by means of the Venturi effect.

Figure 8A:
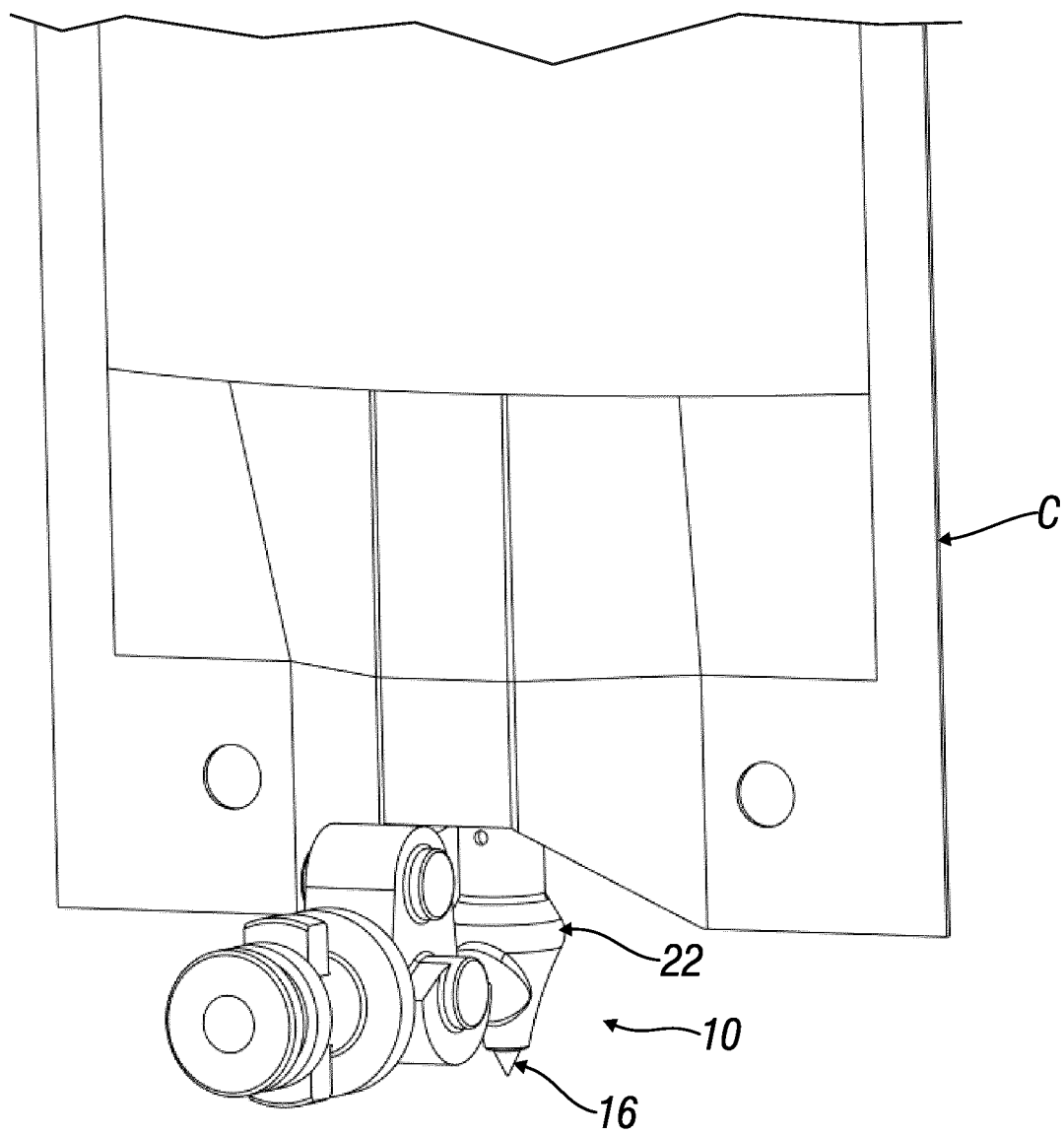
FIGS. 8A-8C show, in a first perspective view, in a cross-sectional view and in a second perspective view respectively, the fluid processing device of FIG. 2 in a second operative position, wherein said fluid processing device protrudes inside the ingredient storage container such that both the fluid and a predefined amount of air or gas can be introduced therein and, at the same time, the resulting beverage product can go out towards a user's cup.
Figure 8B:
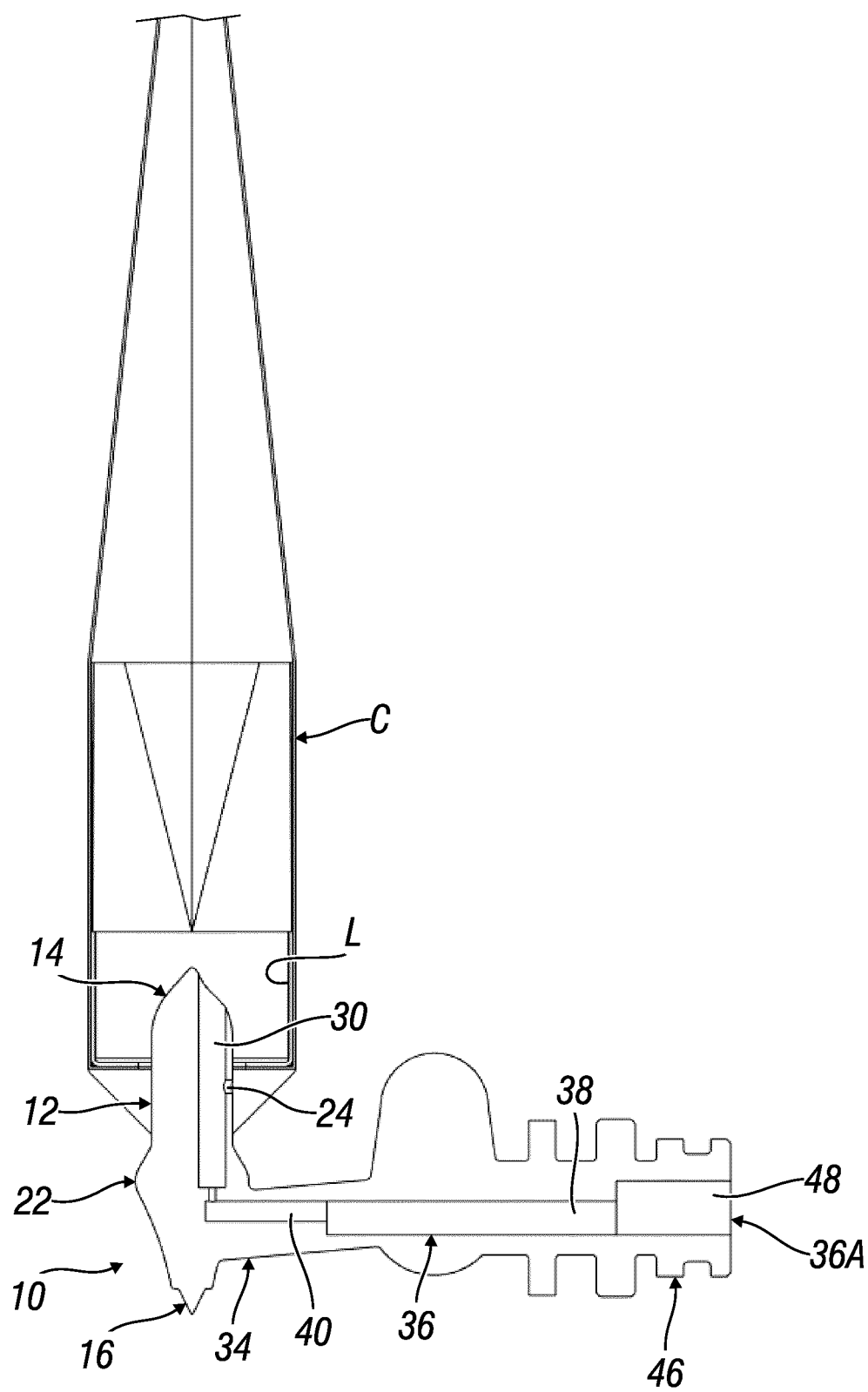
Figure 8C:
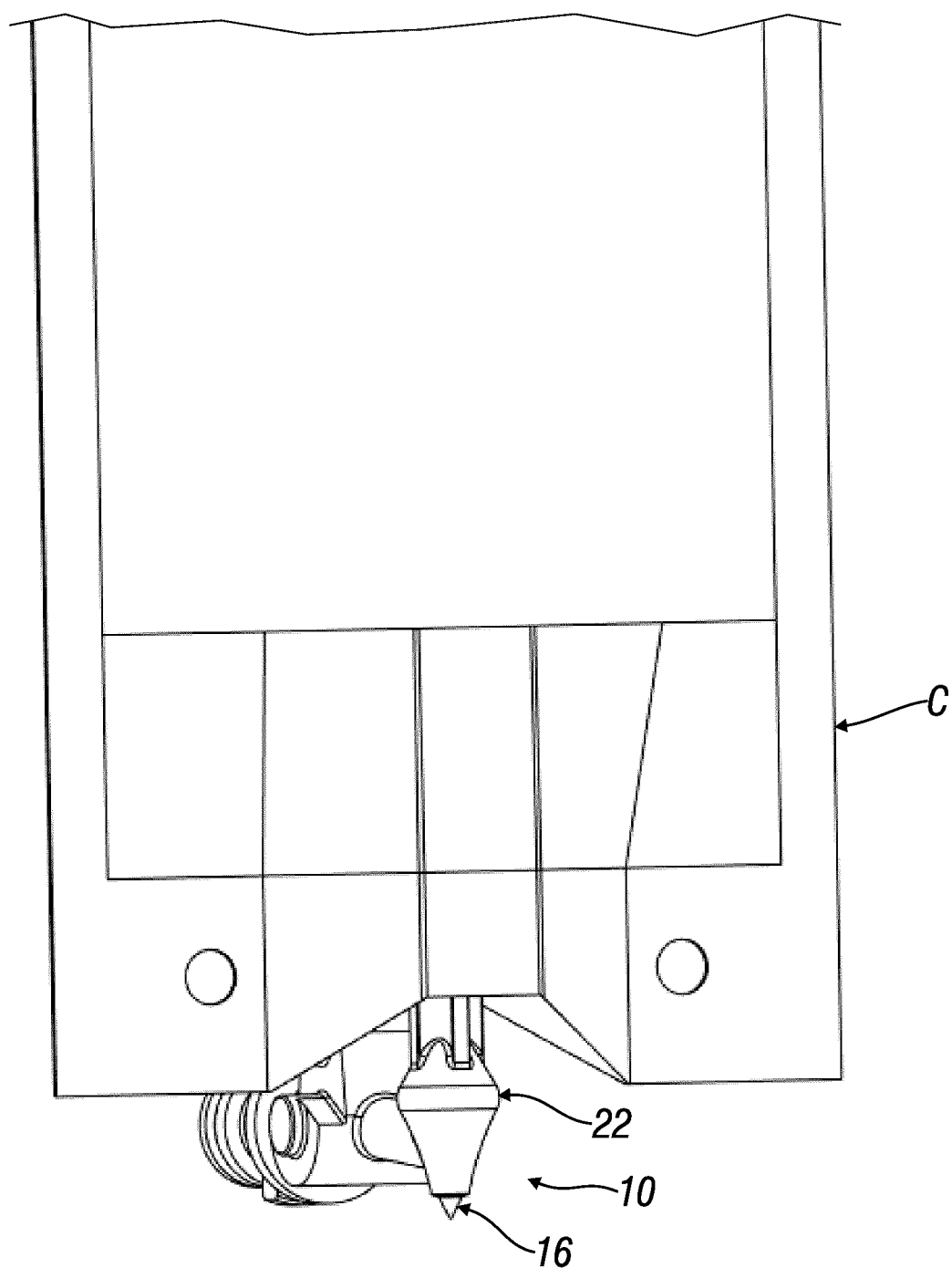
Figure 9A:
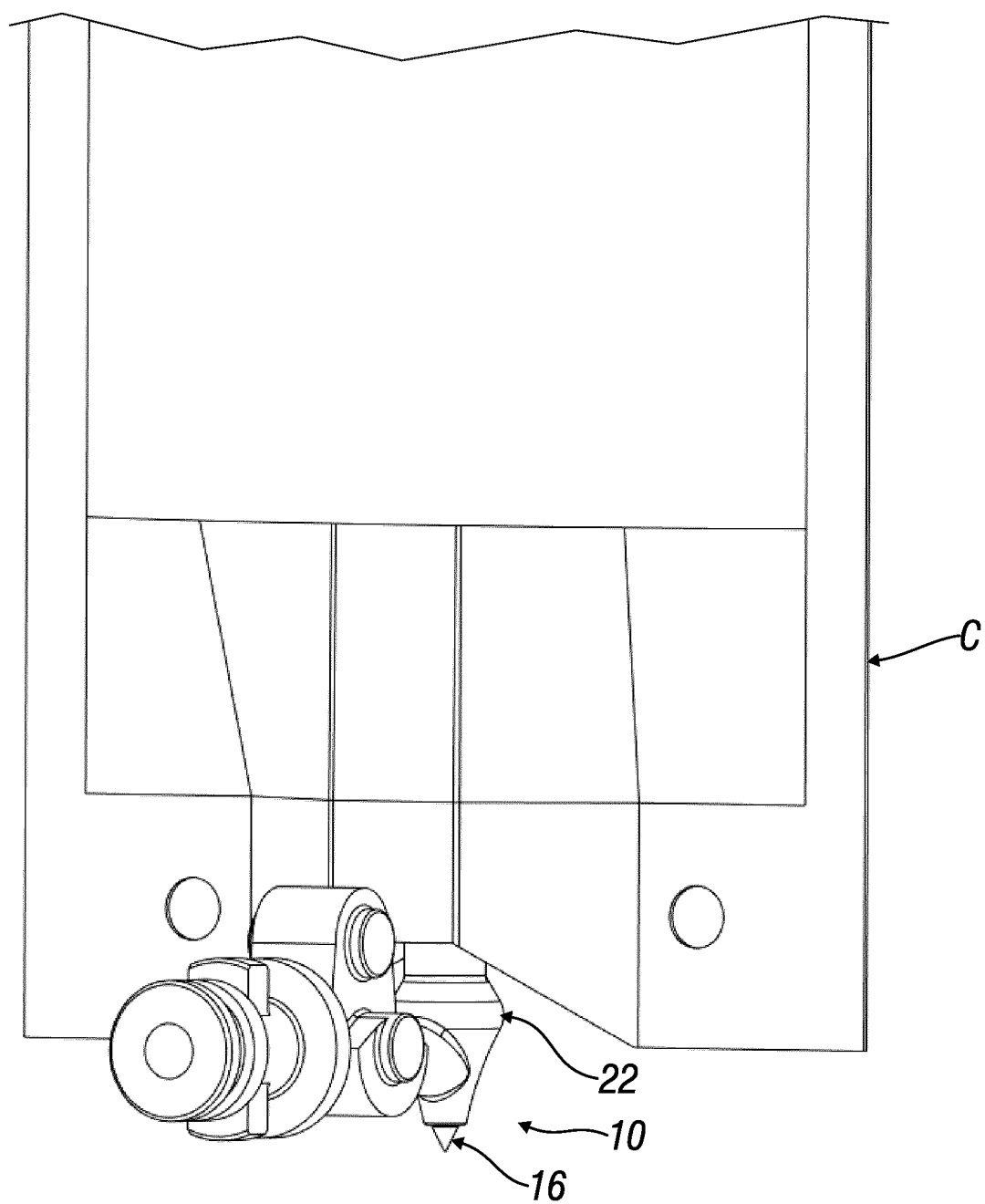
FIGS. 9A-9C show, in a first perspective view, in a cross-sectional view and in a second perspective view respectively, the fluid processing device of FIG. 2 in a third operative position, wherein said fluid processing device protrudes inside the ingredient storage container such that the fluid only can be introduced therein and, at the same time, the resulting beverage product can go out towards a user's cup.
Figure 9B:
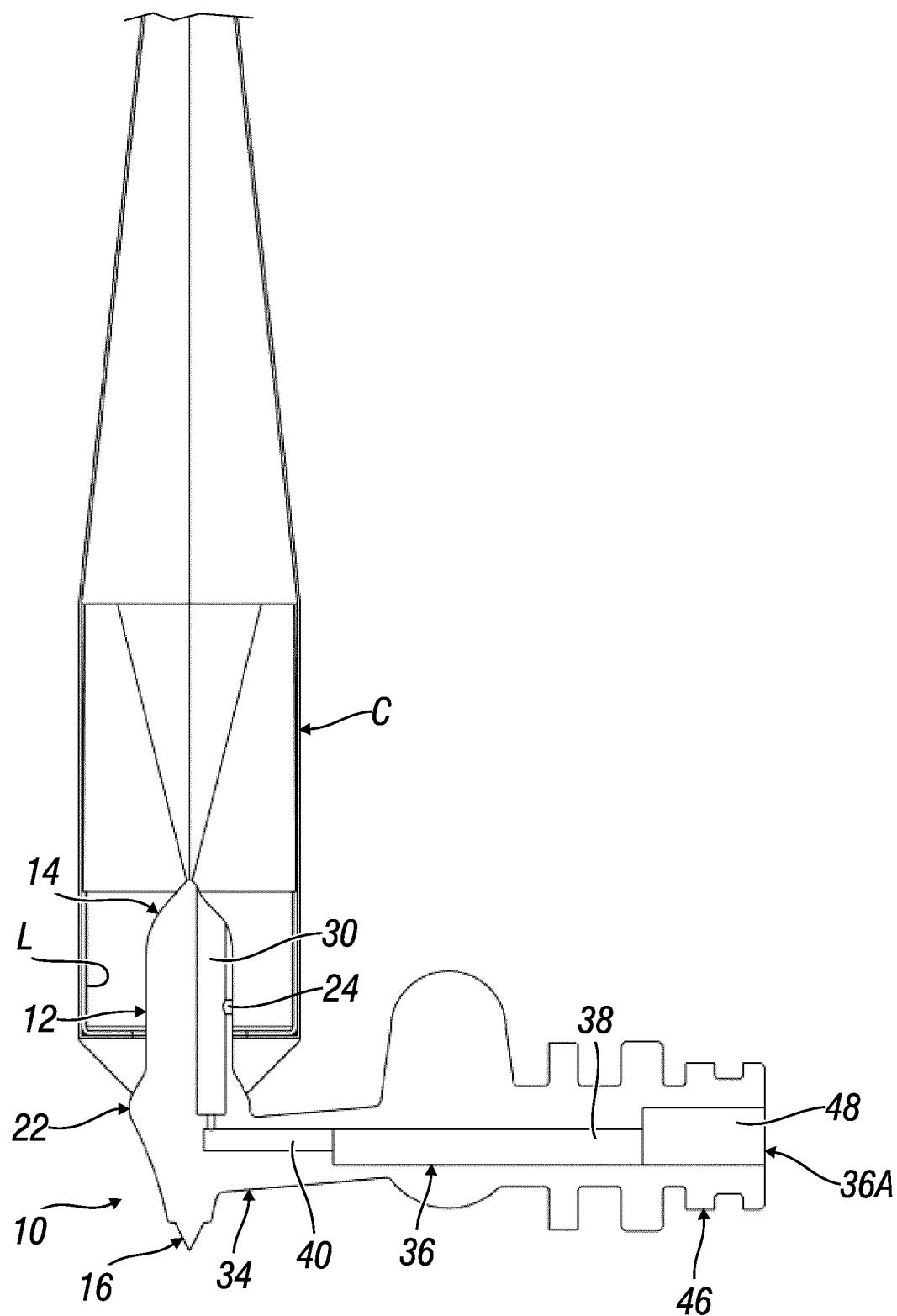
Figure 9C:
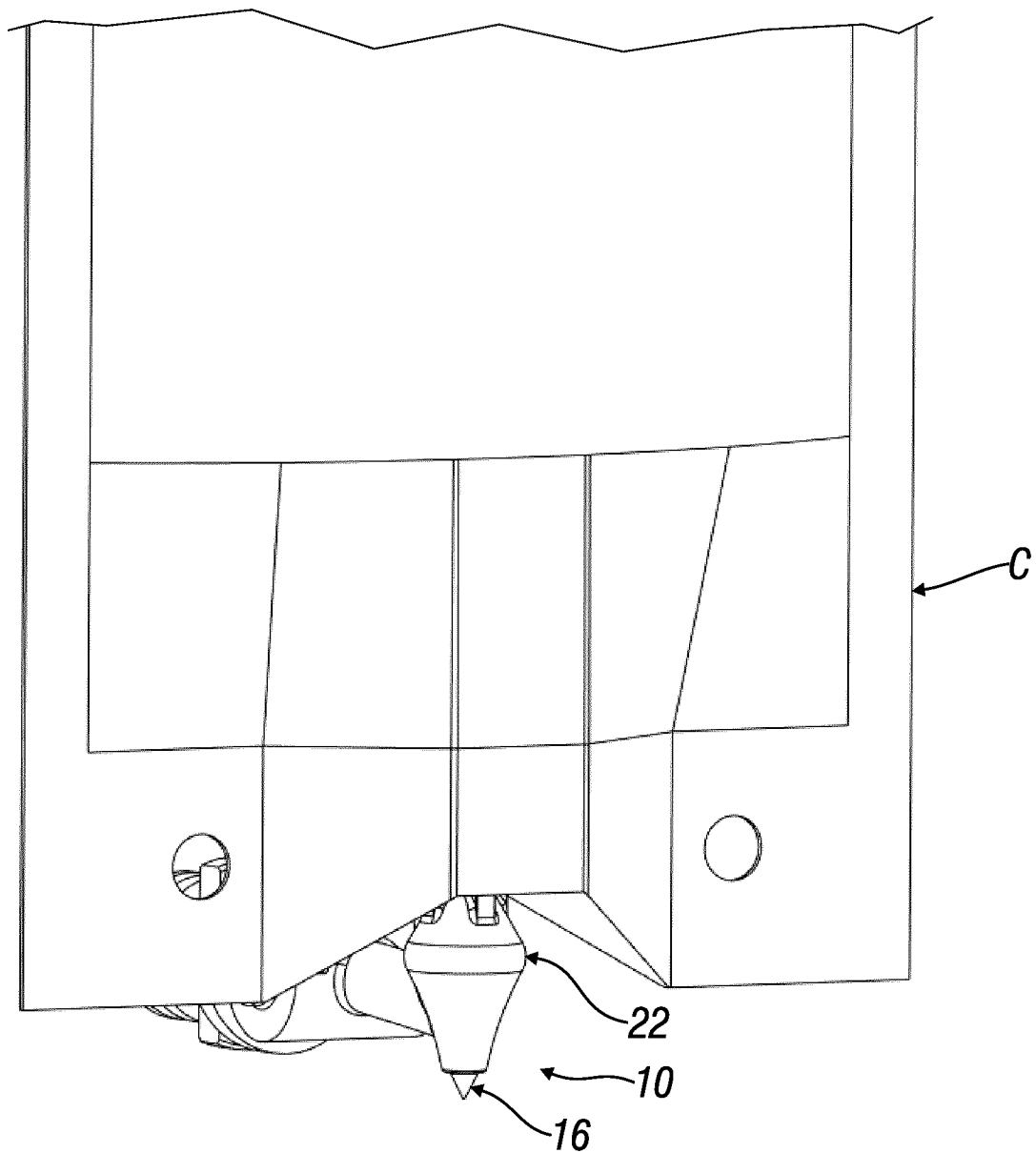

In the case in which the needle-shaped fluid processing body 12 is provided with the air or gas inlet bore 24, the movement means 54, 64 of the beverage preparation machine 1 are configured for separately moving the fluid processing device 10 and the container C relatively one to another in at least one of the following intermediate positions, i.e.:
 a first intermediate position, wherein the air or gas inlet bore 24 is located outside the internal volume of the container C and the sealing means 22, if provided, are not engaged with the container C (FIGS. 8A-8C), and
 a second intermediate position, wherein the air or gas inlet bore 24 is located inside the internal volume of the container C and the sealing means 22, if provided, are still not engaged with the container C (FIGS. 9A-9C).

More specifically, in the embodiment of FIGS. 2-9 the fluid processing device 10 is configured for being moved between the first intermediate position and the second intermediate position, so as to selectively obtain or not the Venturi effect. In another possible embodiment, the fluid processing device 10 is configured for always maintaining its gas inlet bore 24 outside the internal volume of the container C, so as to always obtain the Venturi effect. Preferably, in this possible embodiment of the fluid processing device 10 the gas inlet bore 24 can be located between the sealing means 22 and the second end portion 28 of the needle-shaped fluid processing body 12. More preferably, in this possible embodiment of the fluid processing device 10 the sealing means 22 are not provided on the needle-shaped fluid processing body 12.

The fluid processing device 10 preferably comprises a second fluid processing body 34 connected to the needle-shaped fluid processing body 12 described so far. More preferably, the second fluid processing body 34 is integrally manufactured with the needle-shaped fluid processing body 12 at a conjunction end 44 thereof. The second fluid processing body 34 is internally provided with the second inlet conduit 36 placed in fluid communication with the inlet conduit 30 of the needle-shaped fluid processing body 12.

According to a preferred aspect of the present invention, as shown for example in FIGS. 6B, 7B, 8B and 9B, the second inlet conduit 36 is a convergent conduit having a decreasing cross-sectional area towards the inlet conduit 30. More specifically, the second inlet conduit 36 is preferably provided with at least a first conduit portion 38, having a first predefined cross-sectional area, and with a second conduit portion 40, having a second predefined cross-sectional area which is smaller than the first predefined cross-sectional area of the first conduit portion 38. The second conduit portion 40 is placed downstream of the first conduit portion 38 and is in fluid communication with the inlet conduit 30 obtained in the needle-shaped fluid processing body 12 of the fluid processing device 10.

Additionally, at least one through hole 42 could be interposed between the inlet conduit 30, obtained in the needle-shaped fluid processing body 12, and the second inlet conduit 36, obtained in the second fluid processing body 34. Conveniently, the through hole 42 has an average cross-sectional area which is smaller than both the average cross-sectional area of the inlet conduit 30 of the needle-shaped fluid processing body 12 and the average cross-sectional area of the second inlet conduit 36 of the second fluid processing body 34.

The specific configuration of the second fluid processing body 34, with its convergent cross-sectional profile, and the presence of the through hole 42 allow to properly set the speed of the fluid substance introduced into the container C by the fluid processing device 10. Actually, the convergent cross-sectional profile of the second fluid processing body 34 allows a speed increase of the fluid substance pumped by the beverage preparation machine 1 into the fluid processing device 10. Additionally, the through hole 42 is provided for further increasing the speed of the fluid substance before it runs out of the inlet conduit 30 of the needle-shaped fluid processing body 12. The presence of the through hole 42 ensure a good dissolution of the ingredient(s) and beverage product reconstitution. The through hole 42 defines the flow and the pressure of the fluid substance during the beverage product reconstitution. The through hole 42 may also have an "anti-backflow" function, so as to reduce the risk of fluid substance going back from the container C into the fluid line consisting of the sequence of the inlet conduit 30, the through hole 42 itself and the second inlet conduit 36.

According to a preferred aspect of the present invention, the second fluid processing body 34 is orthogonally disposed with respect to the needle-shaped fluid processing body 12, so that the inlet conduit 30 is substantially orthogonal with respect to the second inlet conduit 36. Therefore, when the fluid processing device 10 is properly connected to the beverage preparation machine 1 in its operative condition, the needle-shaped fluid processing body 12 is oriented along a substantially vertical direction (shown by the axis A in FIG. 4), with its first end portion 26 located at the top and its second end portion 28 located at the bottom, whereas the second fluid processing body 34 is substantially horizontal. As a consequence, in the operative condition of the fluid processing device 10, the inlet conduit 30 is oriented along a substantially vertical direction, whereas the second inlet conduit 36 is oriented along a substantially horizontal direction.

The second fluid processing body 34 could be provided with a coupling portion 46 for removably coupling the fluid processing device 10 to the beverage preparation machine 1. This removably coupling allows the fluid processing device 10 to be removed from the beverage preparation machine 1 and to be washed separately with respect to this machine 1, for example in a dishwasher. The coupling portion 46 is placed at an opposite end of the second fluid processing body 34 with respect to its conjunction end 44 with the needle-shaped fluid processing body 12. As shown in the drawings, the coupling portion 46 can be internally provided with at least one third inlet conduit 48 having an average cross-sectional area which is greater than the average cross-sectional area of the second inlet conduit 36 of the second fluid processing body 34, so as to additionally increase the speed of the fluid substance before it runs out of the inlet conduit 30 of the needle-shaped fluid processing body 12.

Figure 6A:
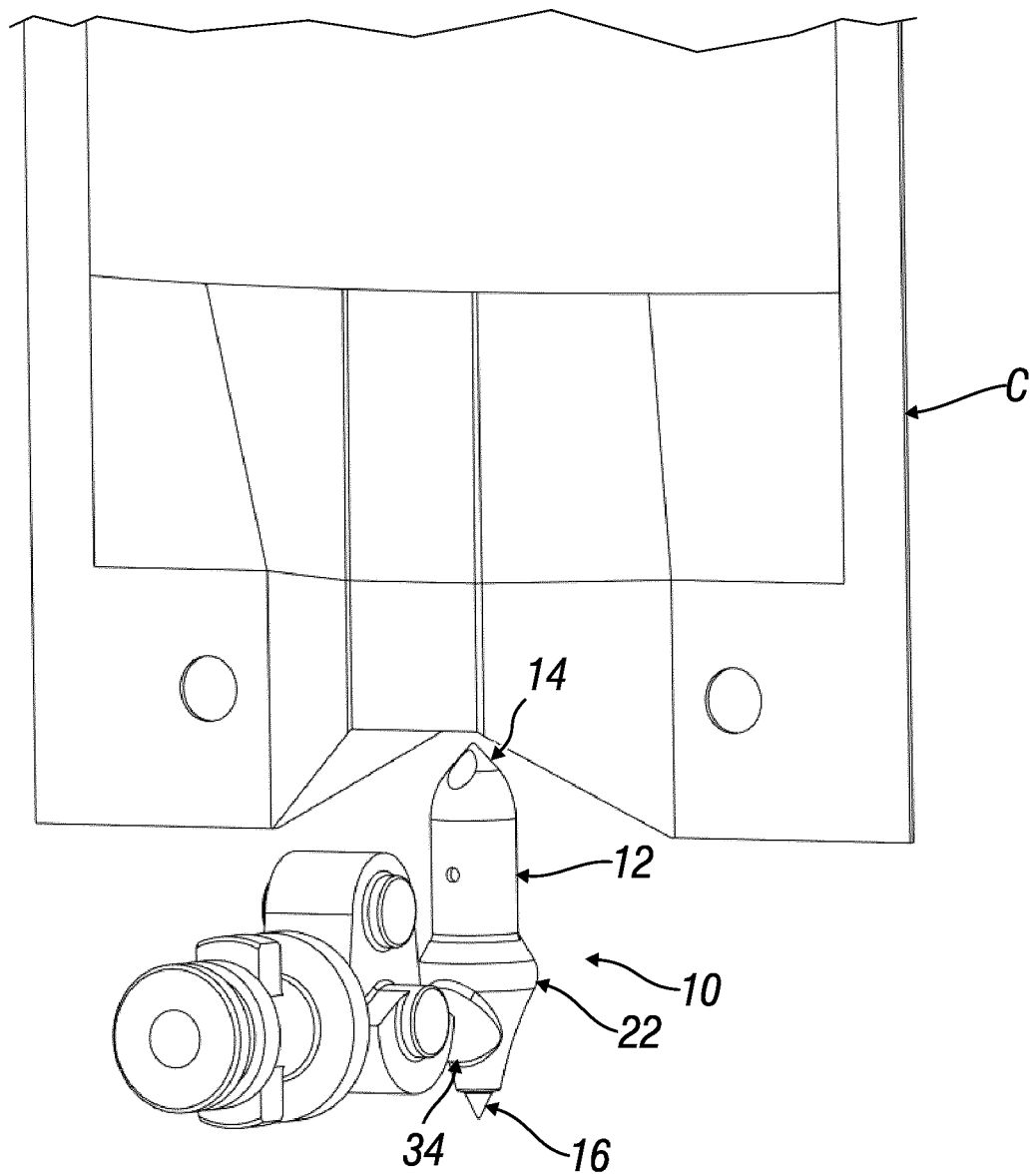
FIGS. 6A-6C show, in a first perspective view, in a cross-sectional view and in a second perspective view respectively, the fluid processing device of FIG. 2 in a non-operative condition, i.e. before the introduction of the fluid into the ingredient storage container.
Figure 6B:
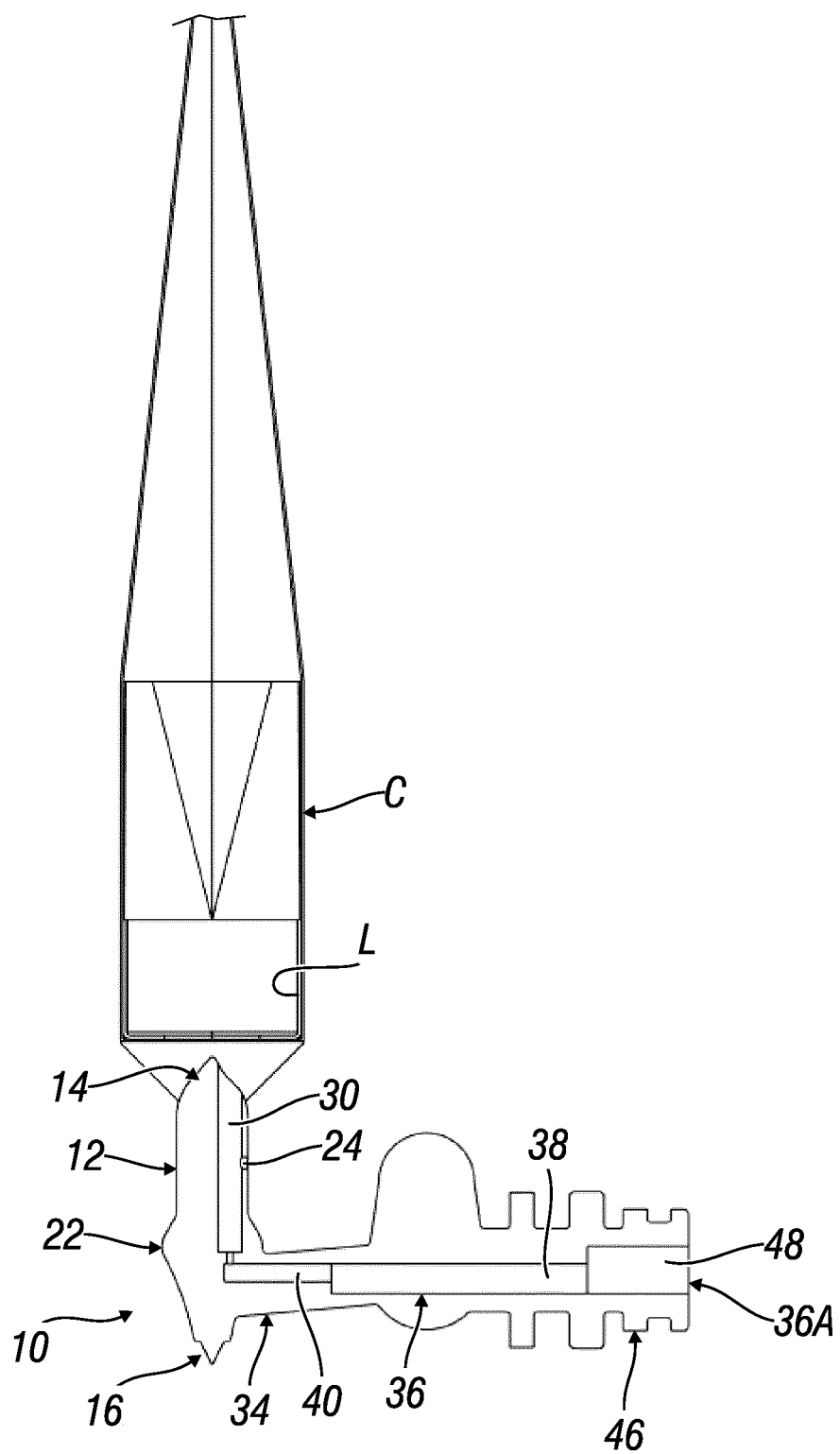
Figure 6C:
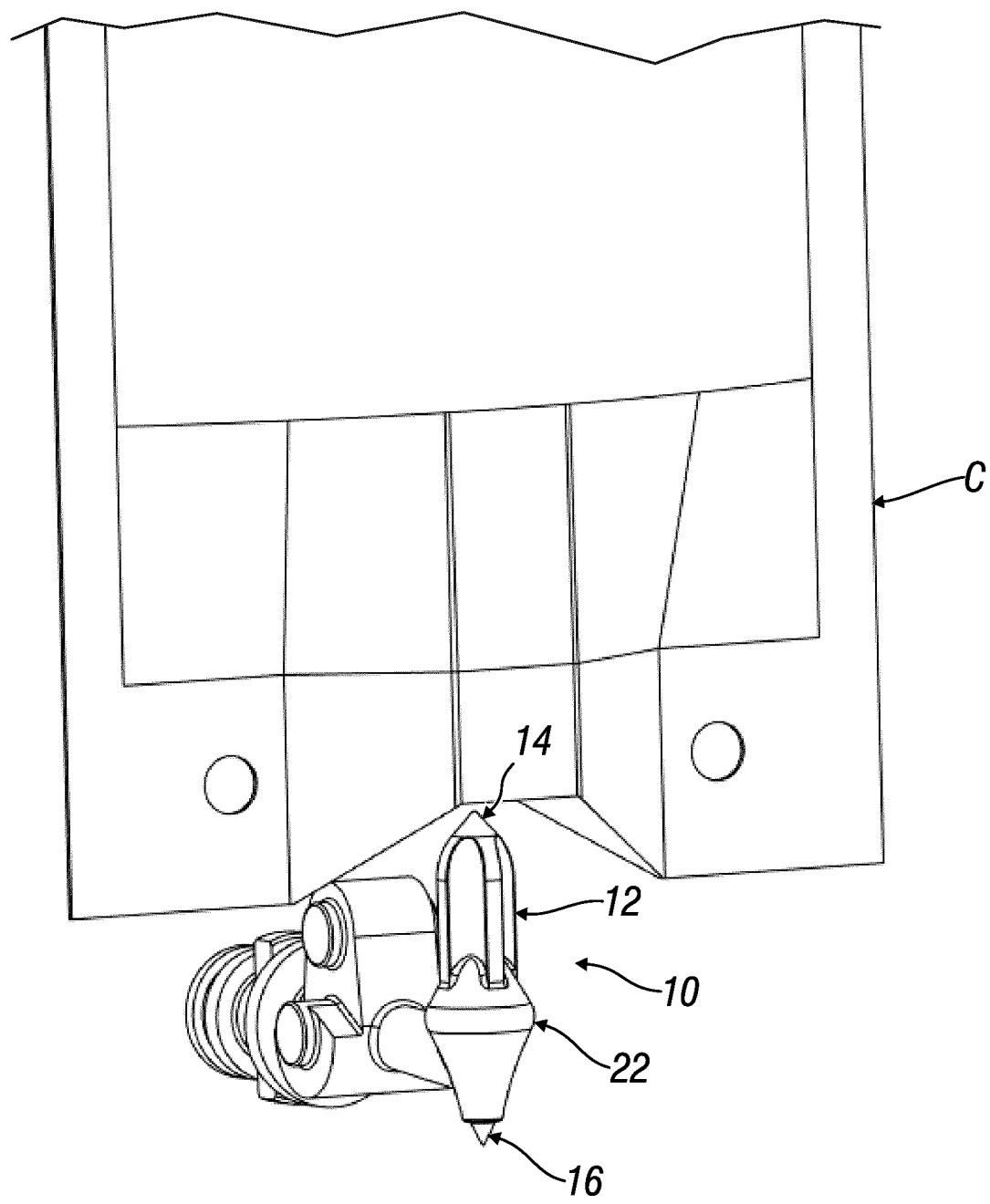

In FIGS. 6A-6C, in a first perspective view, in a cross-sectional view and in a second perspective view respectively, a non-operative condition of the fluid processing device 10 is shown. In this non-operative condition, the fluid processing device 10 is shown outside the container C, i.e. before the introduction of the fluid substance into said container C through the inlet means 18. In other words, in this non-operative condition no fluid substance and other substances pass through the inlet means 18 and the outlet means 20 of the fluid processing device 10.

In FIGS. 7A-7C, in a first perspective view, in a cross-sectional view and in a second perspective view respectively, a first operative condition of the fluid processing device 10, i.e. the fluid introduction position, is shown. In this first operative condition, at least a portion of the needle-shaped fluid processing body 12 protrudes inside the container C such that the fluid substance can be introduced therein by the inlet means 18.

In this fluid introduction position, it is preferred but not indispensable that the sealing means 22, i.e. the enlarged portion 22A of the needle-shaped fluid processing body 12 in the embodiment shown in FIGS. 2-9, are in contact with the bottom wall of the container C. In this embodiment the outlet means 20, i.e. the outlet conduits 32 in the form of grooved channels, are provided on the side wall of the needle-shaped fluid processing body 12 in a position which is above the position of the enlarged portion 22A of said needle-shaped fluid processing body 12. In this way, in the fluid introduction position of the fluid processing device 10 the outlet conduits 32 are completely inserted into the container C and, due to the sealing engagement between the sealing means 22 and said container C, no leakage or few leakage of any fluid substance and/or other substances from the container C is allowed.

In the embodiment shown in FIGS. 2-9, the needle-shaped fluid processing body 12 of the fluid processing device 10 is a point shaped body provided with a first point shaped end portion 26 at its inlet portion 14. Therefore, this point shaped end portion 26 is configured for perforating, and/or piercing, and/or tearing a specific portion of the container C to inject the fluid substance therein. However, as it will be explained hereinafter, other embodiments of the needle-shaped fluid processing body 12 could be envisaged, with an inlet portion 14 configured in a different way for reaching the first operative condition of the fluid processing device 10 in a different way, for example the embodiments of FIGS. 10-14, described in more detail hereinafter.

In the specific embodiment of the beverage preparation machine 1 shown in the figures the container C is preferably manufactured from a multilayer flexible material, more preferably made essentially of a paper layer. Preferably, this container C is thus internally provided, in its lower portion, i.e. at the portion that is engaged by the fluid processing device 10, with an additional layer L of a substantially rigid material. This substantially rigid material can be, for example, a compostable plastic capable of forming a barrier against oxygen and moisture. Compostable means that the whole container C can be discarded after usage together with fruit and vegetable peels. Other embodiments of the container C are however possible, but it is preferable that, in the specific embodiment of the beverage preparation machine 1 shown in the figures, such a container C has a substantially rigid portion at the contact area with the needle-shaped fluid processing body 12, since the relative rigidity of at least a portion of the container C is advantageous for cooperating with the sealing means 22 of the needle-shaped fluid processing body 12.

The preferably substantially rigid layer of the container C is provided, at its bottom, with an injection hole having a cross-sectional shape (e.g. a circular cross-sectional shape) that is compatible with the cross-sectional shape of the needle-shaped fluid processing body 12, i.e. the cross-sectional shape of the point shaped body. In the non-operative condition of the fluid processing device 10, the injection hole is closed (preferably in an air tight mode) by a bottom portion of the multilayer flexible material of the container C. In case of circular cross-sectional shape, the diameter of the injection hole is greater than the average diameter of the point shaped body, but is smaller or equal than the maximum diameter of the sealing means 22 (if these sealing means 22 are provided on the needle-shaped fluid processing body 12), i.e. of the enlarged portion 22A of the point shaped body. With this configuration the needle-shaped fluid processing body 12 is capable of being introduced into the container C through the injection hole (breaking or tearing the portion of the multilayer flexible material that closes said injection hole), during the movement of the needle-shaped fluid processing body 12 towards the container C, until the sealing means 22 have reached their sealing position against the circumferential edge of said injection hole. In this sealing position no further movement between the needle-shaped fluid processing body 12 and the container C is allowed, thus obtaining the fluid introduction position described above and shown in FIGS. 7A-7C.

In FIGS. 8A-8C, in a first perspective view, in a cross-sectional view and in a second perspective view respectively, the first intermediate position of the fluid processing device 10 is shown. In this first intermediate position at least a portion of the needle-shaped fluid processing body 12 still protrudes inside the container C, similarly to what happens in the fluid introduction position described above, but the sealing means 22 are not in tight contact with the bottom wall of the container C. In other words, in this first intermediate position a smaller portion of the fluid processing body 12, compared to the fluid introduction position, protrudes inside the container C (this fact is also visible from a comparison between FIG. 7B and FIG. 8B), so that both the fluid substance can be introduced inside the container C by the inlet means 18 and, simultaneously, the resulting beverage product can go out through the outlet means 20.

More specifically, in this first intermediate position the needle-shaped fluid processing body 12 protrudes inside the container C in such a way that its air or gas inlet bore 24 remains outside said container C. Therefore, in this first intermediate position, injection of air or gas into the container C is possible together with the injection of fluid substance by means of the Venturi effect. It should be noted that the Venturi effect, which is obtained due to the simultaneous injection of fluid substance and air or gas into the container C, occurs only when the injection of fluid substance into the container C is carried out by the inlet means 18. Actually, as soon as the injection of fluid substance into the container C through the inlet means 18 stops, the Venturi sucking effect through the air or gas inlet bore 24 cannot work anymore. Therefore, no Venturi effect occurs in the extraction mode only, i.e. when the beverage product has been fully prepared and flows out through the outlet means 20.

Basically, the Venturi effect is the fact that when the fluid substance circulates at high speed within the inlet means 18 of the fluid processing device 10, it pulls in a quantity of air or gas through the air or gas inlet bore 24. This is due to an aspiration which is a physical property known in the field of fluid mechanics. When air or gas is pulled in (i.e. sucked) into the flow of fluid substance which is injected into the container C, this air or gas too is mixed with the soluble ingredient. The mixture consisting of soluble ingredient, fluid substance and air or gas creates a foaming boost, which is needed for foamy beverage products (foamed milks, creamy chocolates, etc.).

Obviously, the sucking effect of air or gas together with the fluid substance can only work if the air or gas inlet bore 24 is located outside the container C. Therefore, the Venturi effect can be stopped if the needle-shaped fluid processing body 12 is sufficiently inserted within the container C so that the air or gas inlet bore 24 is located inside the container C, such as in the second intermediate position of the fluid processing device 10 described below.

In FIGS. 9A-9C, in a first perspective view, in a cross-sectional view and in a second perspective view respectively, the second intermediate position of the fluid processing device 10 is shown. This second intermediate position is basically similar to the first intermediate position described above, except for the fact that the needle-shaped fluid processing body 12 is inserted within the container C so that the air or gas inlet bore 24 too is located inside the container C (see in particular FIG. 9B), whereas the sealing means 22 are once again not in tight contact with the bottom wall of said container C.

Therefore, in this second intermediate position both the fluid substance can be introduced inside the container C by the inlet means 18 and, simultaneously, the resulting beverage product can go out through the outlet means 20 towards the cup. However, no Venturi effect occurs in this second intermediate position and no air or gas is injected into the container C through the air or gas inlet bore 24, but just fluid substance is introduced into the container C during the injection phase.

Regardless of the Venturi effect, both in the first intermediate position and in the second intermediate position the fluid substance is injected into the container C through the inlet means 18 of the needle-shaped fluid processing body 12. The fluid substance injected into the container C is mixed with the soluble ingredient (e.g. coffee powder) to create the beverage product. In these intermediate positions also, the needle-shaped fluid processing body 12 is partly out of the container C so that the dispensing grooved channels are always at least partially located outside of the container C (i.e. the dispensing grooved channels are open), and therefore they are able to let the beverage product out of the container C, into the user's cup. Therefore, simultaneously with the injection of fluid substance into the container C, beverage product is also dispensed towards the user's cup.

FIGS. 10-14 illustrate further embodiments of the fluid processing device 10. In these embodiments the fluid processing body 12 has a different shape with respect to that disclosed hereinbefore with reference to FIGS. 2-9. More precisely, the outlet means 20 are different from the outlet conduits 32 in the form of grooved channels, since the function of the outlet means 20 could be performed by other outlet guide elements. For example, in the embodiments shown in FIGS. 9-13 the outlet means 20 comprise also at least an outlet conduit arranged inside the fluid processing body 12, similarly to the first inlet conduit 30. In other embodiments these outlet guide elements could be the outer surface of the fluid processing body 12 and/or one or more outlet conduit arranged inside the fluid processing body 12 and/or one or more outlet conduit arranged on the outer surface of the fluid processing body 12.

In the embodiments of FIGS. 10-14 no specific sealing means are provided on the outer surface of the fluid processing body 12. However, a certain sealing function can be performed by a specific portion (not necessarily an "enlarged" portion) of the outer surface of the fluid processing body 12 located below the inlet means 18. If provided, also this specific portion of the outer surface of the fluid processing body 12 can be configured for adhering against a wall of the container C at the portion of said container C opened by the first end portion 26 of the fluid processing body 12. Preferably, in the embodiments of FIGS. 10-14, no sealing means 22 of any kind are provided between the fluid processing body 12 and the container C, with the result of a small or negligible leakage of fluid substance that falls into the user's cup during beverage preparation.

Advantageously, in the embodiments of FIGS. 10-14 the outer surface of the fluid processing body 12 is tapered. Always advantageously, the inlet conduit of the second fluid processing body 34 has a decreasing cross-sectional area towards the inlet conduit 30 as disclosed for the embodiment of FIGS. 2-9. Additionally, it has to be noted that at least one of the first end portion 26 and/or the second end portion 28 of the fluid processing body 12 may not be point shaped, but it could be a substantially flat portion or slightly curved portion. Actually, also a substantially flat first end portion 26 of the fluid processing body 12 could effectively open a specific portion or wall of the container C, for example by pushing this portion or wall inside the container C and/or detaching or desealing it from the container C. In this case, the container C is designed in such a way that its specific portion or wall is welded or glued to the container's bottom, such that it covers and closes a through hole provide at this bottom. Alternatively, this specific portion or wall could be provided with a sort of weakening profile that allows the first end portion 26 of the fluid processing body 12 to detach, or deseal, and/or push this portion or wall inside the container C. According to this embodiment not having a point shaped first end portion 26, the fluid processing body 12 may have any suitable shape, not necessarily a needle shape.

In the embodiments of FIGS. 10-14 the optional gas inlet bore 24 can be positioned on the fluid processing device 10 in such a way that it remains outside the container C with a Venturi effect, such as in the second operative condition of the embodiment of FIGS. 2-9, or can be located inside the container C without Venturi effect, such as in the third operative condition of the embodiment of FIGS. 2-9. Preferably, in the embodiment of FIGS. 9 and 10 the gas inlet bore 24 is positioned on the second fluid processing body 34 of the fluid processing device 10 and is always in fluid communication with the inlet means 18 of the fluid processing body 12 through a dedicated conduit 24A (shown in FIG.

Figure 12:
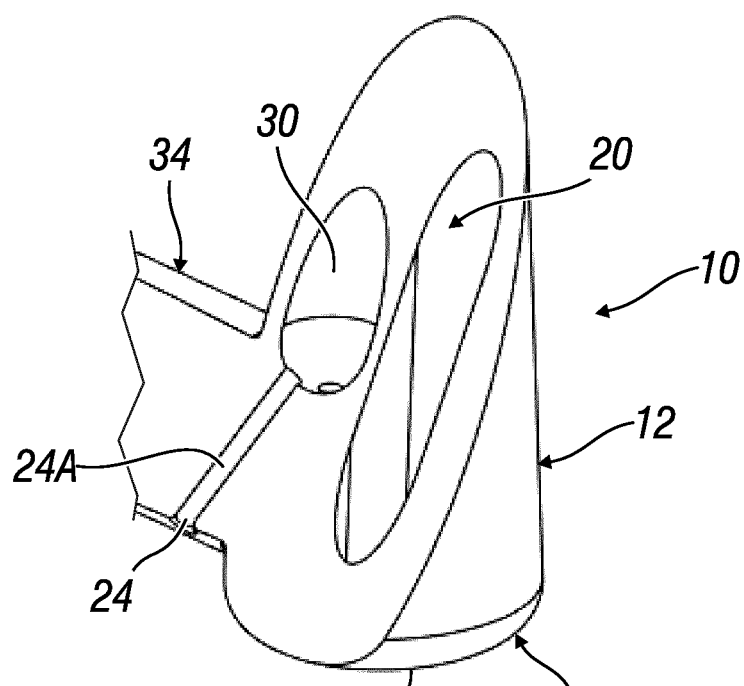
FIG. 12 is another cross-sectional view of the fluid processing device of FIG. 10.
Figure 13:
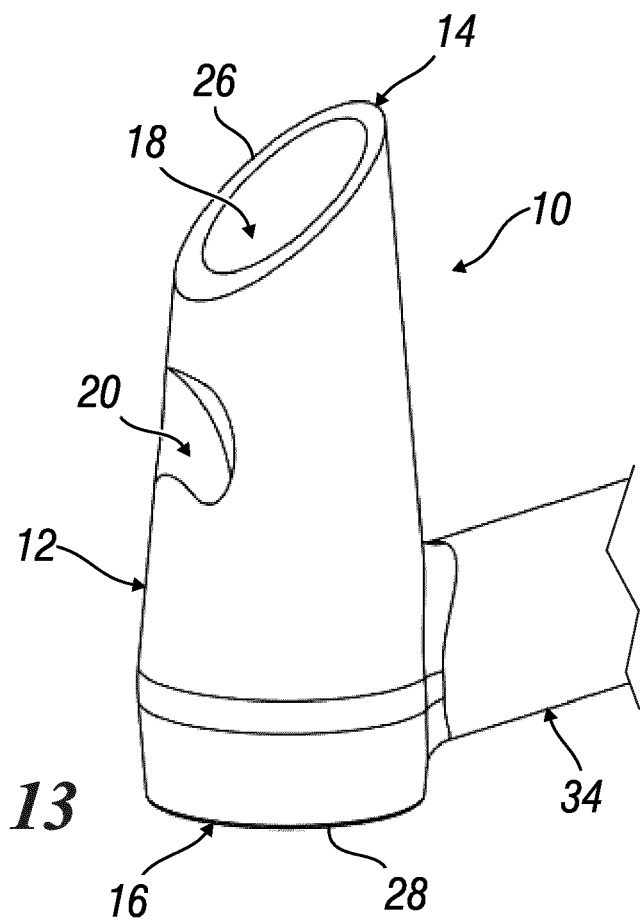
FIG. 13 is a perspective view of a further possible embodiment of a fluid processing device for a beverage preparation machine according to the present invention.
Figure 14:
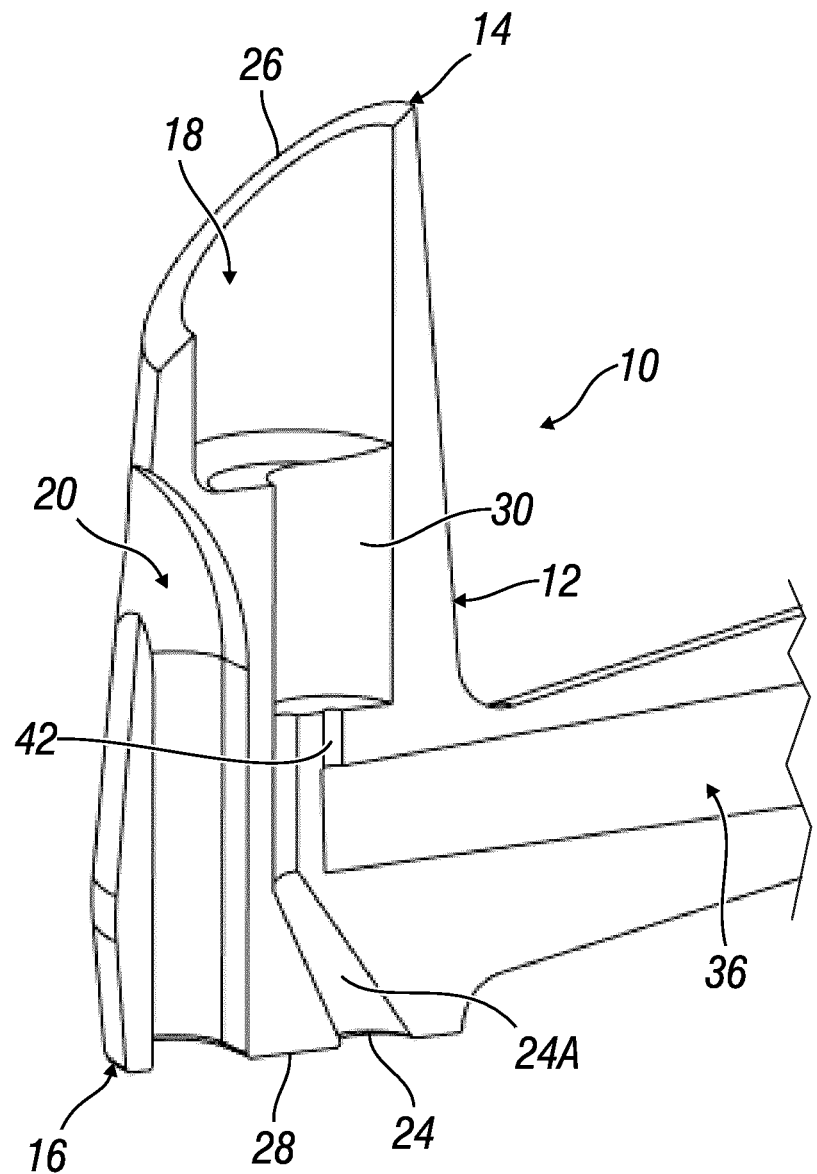
FIG. 14 is a cross-sectional view of the fluid processing device of FIG. 13.

12). In this embodiment of FIGS. 9 and 10 the gas inlet bore 24 is in a position on the fluid processing device 10 such that said gas inlet bore 24 always remains outside the container C, thus always providing for the Venturi effect. In the embodiment of FIGS. 11-13 the gas inlet bore 24 is positioned of the fluid processing body 12 at the second end portion thereof, i.e. the lower portion of the fluid processing body 12, and is always in fluid communication with the inlet means 18 of the fluid processing body 12 through a dedicated conduit 24A (shown in FIG. 14). Also in this embodiment of FIGS. 11-13 the gas inlet bore 24 is in a position on the fluid processing device 10 such that said gas inlet bore 24 always remains outside the container C, thus always providing for the Venturi effect. According to further modifications of the fluid processing device 10, not shown in the drawings, the optional gas inlet bore 24 could be arranged on the fluid processing body 12 and/or on the second fluid processing body 34 in different positions, such that it always remains outside the container C, thus always providing for the Venturi effect.

In view of all the embodiments described so far, it should be intended that the term "opening", when referred to a specific portion or wall of the container C, means: perforating, or piercing, or tearing, or detaching, or desealing, or pushing inside the container C, or opening in any equivalent manner, this specific portion or wall of the container C before the introduction of the fluid substance into said container C.

Preferably, the container C is a one-use container such as a pouch or a sachet or any known container having at least side walls which are flexible. The container C can also be any other openable (e.g. pierceable) closed package such as a capsule, a pod, a pad, a bottle, a flow-bag, a canister, or the like. The container C can also alternatively be a multi-dose container, having for instance a large storage compartment for storing several doses of ingredient, and a dosing and mixing chamber that is able to receive one dose at a time of ingredient that is transferred from the storage compartment.

Figure 15B:
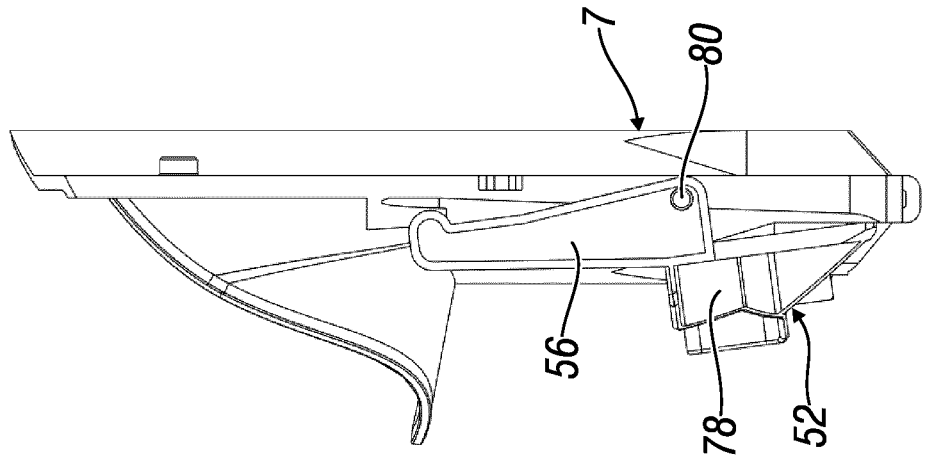
FIGS. 15A-15B show, in side view, two different operative positions of locking means of the beverage preparation machine that are capable of selectively locking/unlocking the ingredient storage container with respect to the container holder.
Figure 15A:
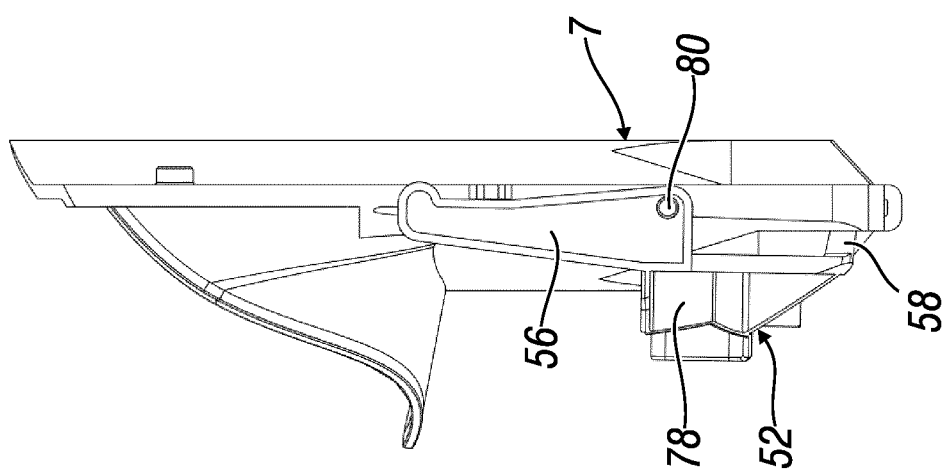
Figure 15D:
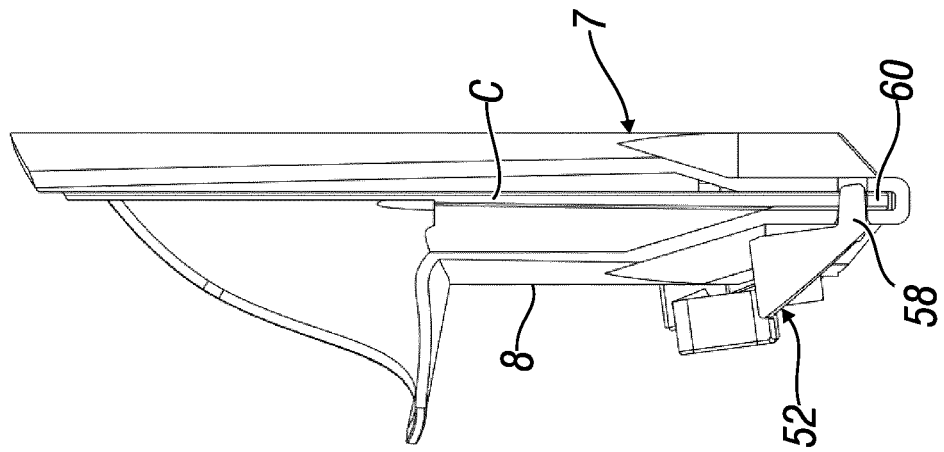
FIGS. 15C-15D show, in side cut view, the two different operative positions of the locking means of FIGS. 15A-15B respectively.
Figure 15C:
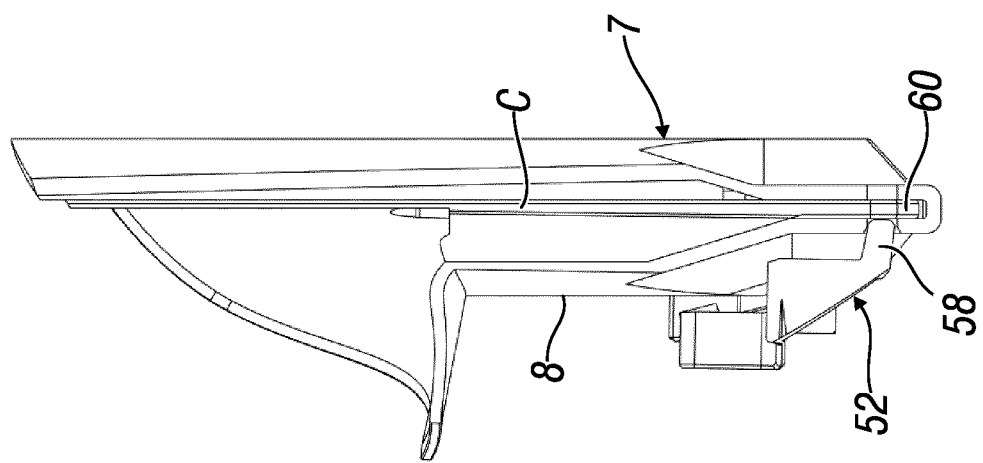

FIGS. 15A-15D disclose an embodiment of a container holder 7 for the beverage preparation machine 1. This container holder 7 is not described in full detail, since it is of a type known in the state of the art and it comprises a seat 8 for supporting the container C. As shown in FIGS. 15A-15B, the beverage preparation machine 1 can be provided with first locking means 52 for selectively locking/unlocking the container C with respect to the container holder 7 when the container C is received into its seat 8 of said container holder 7. In the embodiment according to FIGS. 15A-15D, the container holder 7 is fixed with respect to the fluid processing device 10.

In a first preferred embodiment of the beverage preparation machine 1, shown in FIGS. 15A-15D and 16A-16B, the fluid processing device 10 is mobile with respect to the container C, which is fixed with respect to its container holder 7 and to the beverage preparation machine 1. In this specific embodiment of FIGS. 15A-15D the movement means 54, 64 of the beverage preparation machine 1 comprises first actuation means 54 (FIGS. 16A-16B) for moving the fluid processing device 10 with respect to the container C between at least the fluid introduction position and the beverage dispensing position and vice versa. In this specific embodiment of FIGS. 15A-15O the first locking means 52 of the container C with respect to the container holder 7 comprise a first gear and/or leverage mechanism 56. In this specific embodiment of FIGS. 15A-15D the first gear and/or leverage mechanism 56 consists of at least a lever 78 which is rotatable around a respective hinge 80 obtained on a fixed portion of the beverage preparation machine 1. The first gear and/or leverage mechanism 56 is thus movable with respect to a fixed portion of the beverage preparation machine 1 and at least one tooth 58, provided on the lever 78, is selectively engageable with at least one corresponding hole 60 (FIGS. 15C-15D) provided in the container C. The container C is detachable from the container holder 7, and thus from the beverage preparation machine 1, only in the non-engaged position of the tooth 58 with respect to the corresponding hole 60. It should be noted that this embodiment of the first gear and/or leverage mechanism 56 is described and illustrated with explanatory purposes only, and further embodiments of this first gear and/or leverage mechanism could be provided.

In the embodiment of FIGS. 16A-16B, showing a fluid processing device 10 which is mobile with respect to the container C, the first actuation means 54 comprise a second gear and/or leverage mechanism 62 connected to the fluid processing device 10. In this specific embodiment of FIGS. 16A-16B the second gear and/or leverage mechanism 62 consists of a plurality of gears 74 that actuates at least a rod 76 connected to the fluid processing device 10. The second gear and/or leverage mechanism 62 is configured for moving the fluid processing device 10 with respect to the container C along the vertical axis A of the needle-shaped fluid processing body 12. More specifically, as shown in FIGS. 16A-16B, the rotation of the gears 74 causes a corresponding vertical movement of the rod 76 that, in turn, vertically moves the fluid processing device 10 along the axis A between the engaged position of FIG. 16A (i.e. the fluid introduction position of FIGS. 7A-7C) and the non-engaged position of FIG. 16B (i.e. the non-operative condition of FIGS. 6A-6C). Additionally, the rotation of the gears 74 and the corresponding vertical movement of the rod 76 also cause the vertical movement of the fluid processing device 10 along the axis A to reach the first intermediate position of FIGS. 8A-8C (i.e. the intermediate position wherein the Venturi effect is activated) and, if required, the second intermediate position of FIGS. 9A-9C (i.e. the intermediate position wherein the Venturi effect is not activated). It should be noted that this embodiment of the second gear and/or leverage mechanism 62 is described and illustrated with explanatory purposes only, and further embodiments of this second gear and/or leverage mechanism could be provided.

Figure 17A:
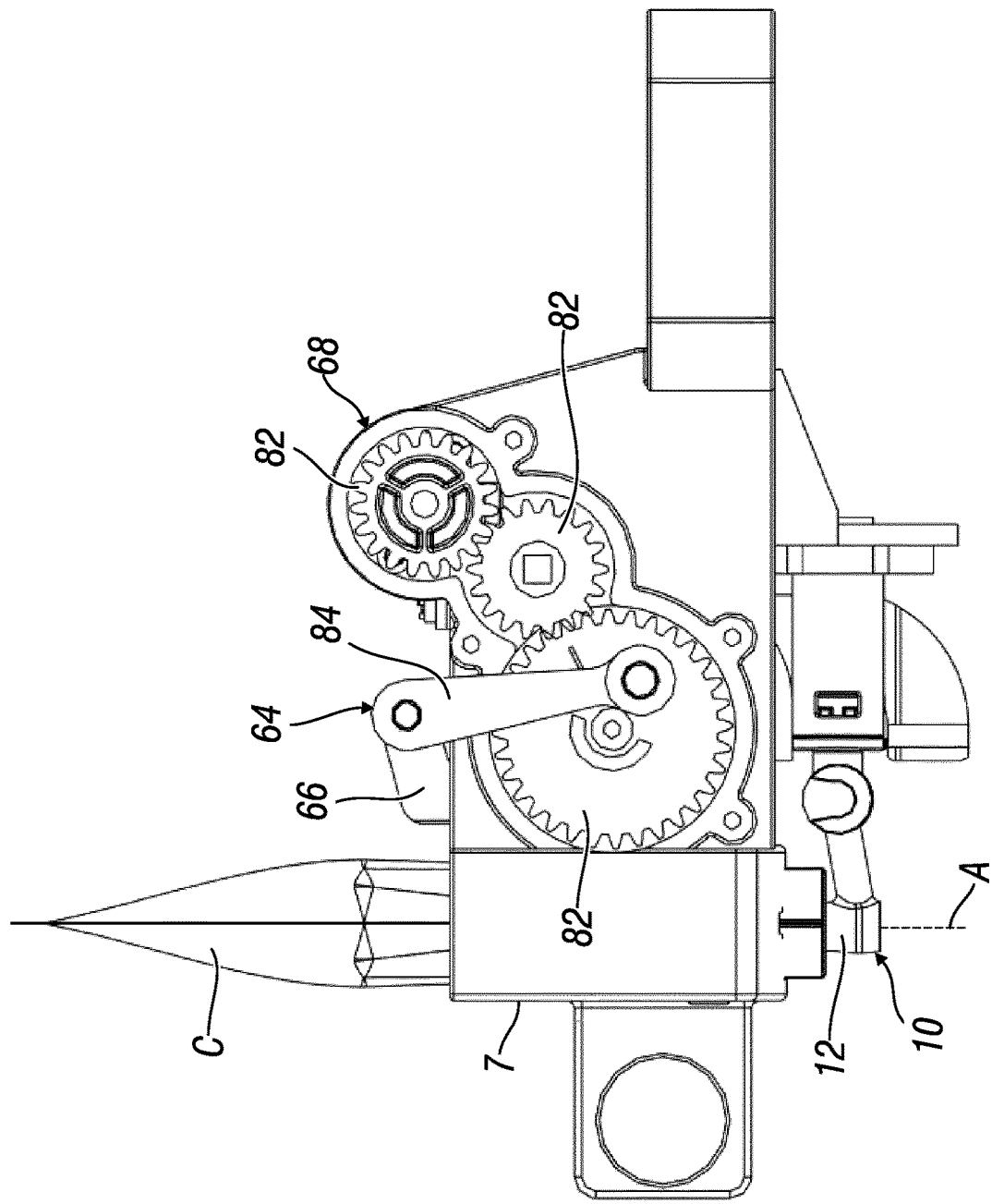
Figure 18:
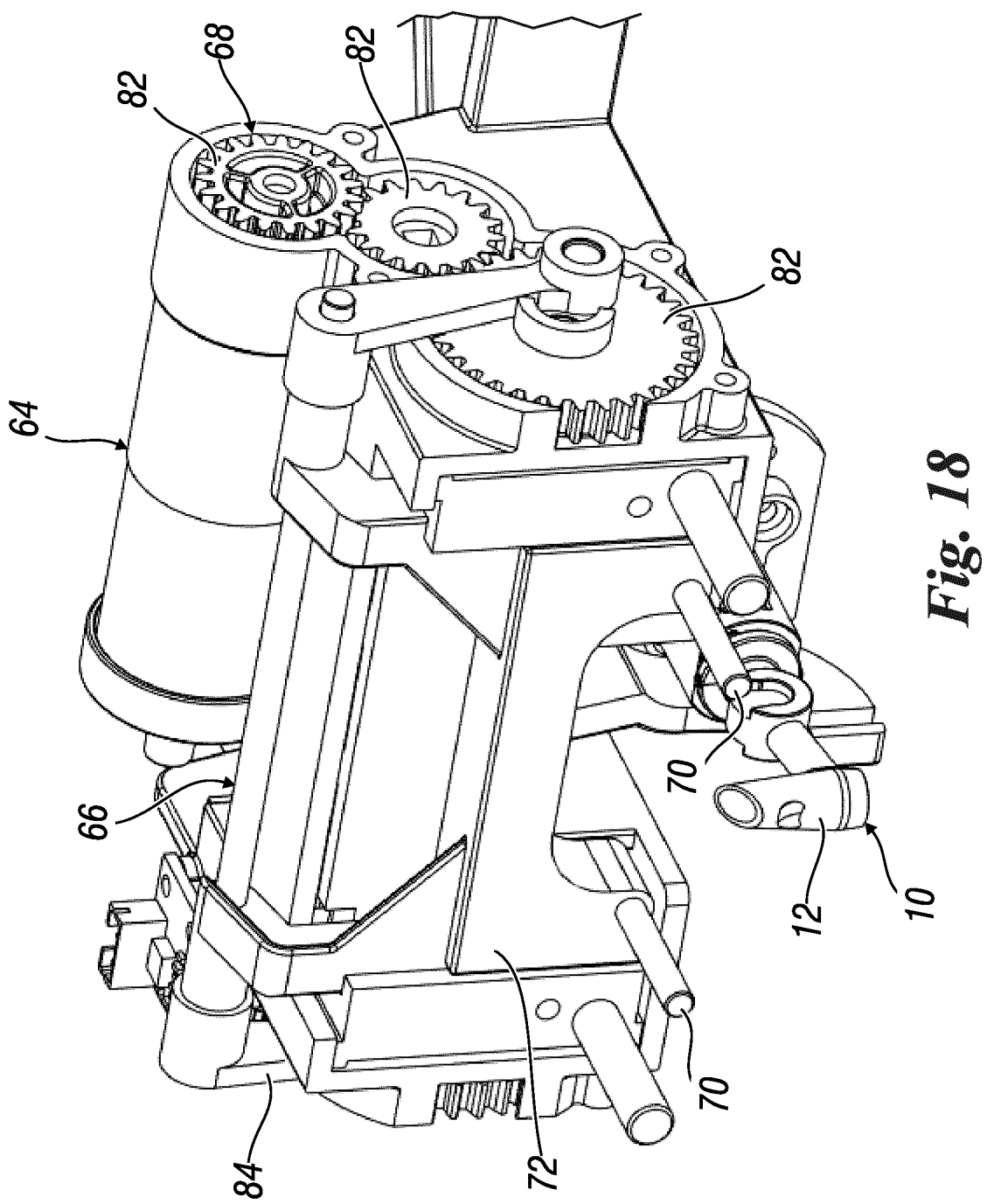
FIG. 18 is a detailed view of some components of the actuation means of FIGS. 17A-17B.

In a second preferred embodiment of the beverage preparation machine 1, shown in FIGS. 17A-17B and 18, the fluid processing device 10 is fixed with respect to the container holder 7 and the container C is mobile with respect to both the container holder 7 and the fluid processing device 10. In this specific embodiment the movement means 54, 64 of the beverage preparation machine 1 comprises second actuation means 64 for moving the container C with respect to the fluid processing device 10. More specifically, since in this embodiment of the beverage preparation machine 1 the container C only is movable with respect to the fluid processing device 10, the movement means 54, 64 are configured for moving said container C, starting from the non-operative condition of FIGS. 6A-6C, between the fluid introduction position and the beverage dispensing position and vice versa.

In the embodiment of FIGS. 17A-17B and FIG. 18, showing a container C which is mobile with respect to the fluid processing device 10, the second actuation means 64 comprise a container support device 66 and a third gear and/or leverage mechanism 68. In this specific embodiment of FIGS. 17A-17B and 18 the third gear and/or leverage mechanism 68 consists of a plurality of gears 82 that are put in rotation for driving a rotation and translation movement of a linkage 84. The container support device 66 is actuated by the third gear and/or leverage mechanism 68 for moving the container C with respect to the container holder 7 and with respect to the fluid processing device 10 along the vertical axis A of the needle-shaped fluid processing body 12. As shown in FIG. 18, the container support device 66 is provided with second locking means 72 comprising, for example, at least one pin 70 selectively engageable with at least one corresponding hole 60 provided in the container C. Operatively, the rotation of the gears 82 causes the rotation and translation movement of the linkage 84, that is connected to the second locking means 72 (as shown in FIG. 18). In turn, the rotation and translation movement of the linkage 84 causes a vertical movement, i.e. along the vertical axis A, of the container support device 66 and its respective second locking means 72. Since the pins 70 of the second locking means 72 are engaged with the corresponding holes 60 provided in the container C, this container C is thus vertically moved with respect to the fluid processing device 10 (which is fixed) between all the positions shown in FIGS. 6A-9C. It should be noted that the container C is detachable from the container holder 7, and thus from the beverage preparation machine 1, only in the non-engaged position of the pin 70 with respect to the corresponding hole 60. It should also be noted in this embodiment, other locking means could be provided in place of the second locking means 72 of FIG. 18. For example, the first locking means 52 shown in FIGS. 15A-15C, wherein a mobile fluid processing device 10 and a fixed container C are shown, could also be used instead of the second locking means 72 in connection with the third gear and/or leverage mechanism 68 of FIGS. 17A-17B and 18, wherein a fixed fluid processing device 10 and a movable container C are shown. For the same reason, the second locking means 72 shown in FIGS. 17A-17B and 18 could also be used instead of the first locking means 52 in connection with first gear and/or leverage mechanism 52 of FIGS. 15A-15C. Finally, it should be noted that this embodiment too of the third gear and/or leverage mechanism 68 is described and illustrated with explanatory purposes only, and further embodiments of this third gear and/or leverage mechanism could be provided.

Last but not least, in a preferred embodiment of the invention, in addition to a first container holder and fluid processing device as described in detail above, the beverage preparation machine 1 comprises a second container holder and fluid processing device (not illustrated in the drawing). Preferably, the second fluid processing device is connected fluidly to the same fluid circulation system that is also connected to the first fluid processing device described above. This brings the advantage that the machine is less complex and costly to manufacture and operate. However, of course, a second fluid circulation system, independent but similarly constructed to the first one, can be included in the same beverage preparation machine.

In this embodiment, a preferred set-up is that the first container adapted to be inserted in the first container holder and processed with the first fluid processing device is a sachet (an embodiment of which is described here above) that is constructed to contain a soluble ingredient for mixing with a fluid (e.g. water), said ingredient being for instance a dairy composition, tea-based compositions, chocolate-based compositions, soups, fruit compositions such as smoothies, and the like. The sachet can also contain a leaf-tea ingredient, or plant-based soluble or infusable ingredient. Generally, the fluid processing in the sachet-type container is performed at a low pressure, as provided in the description here above.

The second container adapted to be inserted in the second container holder and processed with the second fluid processing device, is preferably a rigid or semi-rigid container, such as a capsule or a pod, containing an ingredient adapted to be extracted at a higher fluid pressure than the fluid pressure used with the first fluid processing device. Such an ingredient is typically a roast and ground coffee, which is extracted according to the coffee extraction techniques known in the art, by circulating pressured water therethrough. The fluid that circulates through the coffee grounds is preferably, but not necessarily hot water (generally hot water for coffee extraction circulates through the ingredient at a temperature of between 75 and 95° C.). Water at room temperature, or even chilled water can however be used for so-called "cold brew coffee" preparation. In this case, the container holder is preferably a brewing chamber comprising two elements movable relatively one to another to be able to open said chamber for insertion or removal of the container, and then close said chamber for extraction of the ingredient contained in said container. No further details are provided in the present description, since such brewing chambers are known in the art of beverage machines.

In order to control the preparation of different ingredients, the beverage machine comprises a control panel (either attached to said machine casing, or in a remote device) and a control chip board that is able to operate the fluid processing devices, and fluid circulation system for either simultaneous, or sequential preparation of the beverages from the first and second containers.

It should be understood that various changes and modifications to the presently preferred embodiment of the beverage preparation machine 1 described herein will be apparent to those skilled in the art. Such changes and modifications can be made without departing from the scope of the present invention covered by the appended claims.

The invention claimed is:

1. A beverage preparation machine comprising:
a fluid circulation system for a fluid substance, the fluid circulation system comprising at least one fluid source, at least one fluid pump and at least one fluid circulation conduit;
at least one container holder adapted for receiving a corresponding container; and
at least one fluid processing device which is part of the fluid circulation system and which comprises a fluid processing body comprising in turn at least one inlet member for introducing the fluid substance into the container for the preparation of a beverage product by mixing of the fluid substance with an ingredient contained in the container,
wherein the fluid processing body further comprises at least one outlet member for dispensing the beverage product from the container, wherein at least one movement member is provided for separately moving the at least one fluid processing device and the container relatively one to another between:
a fluid introduction position, wherein the fluid processing body protrudes inside the internal volume of the container for introducing therein the fluid substance, and
a beverage dispensing position, wherein the fluid processing body is at least partially withdrawn from the internal volume of the container to allow dispensing of the beverage product from the container through the at least one outlet member.

2. The beverage preparation machine according to claim 1, characterized in that the fluid processing body is a needle-shaped fluid processing body, comprising at least one end portion configured for perforating, piercing and/or tearing a specific portion or wall of the container before the introduction of the fluid substance into the container.

3. The beverage preparation machine according to claim 1, characterized in that the fluid processing body further comprises at least one sealing member which, in the fluid introduction position, is engaged with the container to block dispensing of the beverage product from the container and, in the beverage dispensing position, is not engaged with the container to allow dispensing of the beverage product from the container.

4. The beverage preparation machine according to claim 1, characterized in that the fluid processing body further comprises:
an inlet portion, wherein the at least one inlet member for introducing the fluid substance into the container is provided at the inlet portion;
an outlet portion, wherein the at least one outlet member for dispensing the beverage product from the container is provided at the outlet portion;
a first end portion provided at the inlet portion, the first end portion being configured for opening a portion of the container;
a second end portion provided at the outlet portion, the second end portion being configured for dispensing the beverage product; and
at least one inlet conduit arranged within the fluid processing body, the at least one inlet conduit being in fluid communication with the first end portion and with a second inlet conduit of the at least one fluid processing device,
wherein the at least one inlet member and the at least one outlet member are separate one to another, wherein the at least one inlet member comprises the at least one inlet conduit and the first end portion, and wherein the at least one outlet member comprises at least the second end portion.

5. The beverage preparation machine according to claim 4, characterized in that the at least one outlet member comprises at least one outlet conduit which is distinct from the at least one inlet conduit, which is provided on the outer surface of the fluid processing body and which is in fluid communication with the second end portion.

6. The beverage preparation machine according to claim 4, wherein the at least one fluid processing device further comprises at least one air or gas inlet bore which is in fluid communication with the at least one inlet member, wherein the at least one movement member is further configured for separately moving the at least one fluid processing device and the container relatively one to another in at least one of the following positions:
a first intermediate position, wherein the at least one air or gas inlet bore is located outside the internal volume of the container and at least one sealing member is not engaged with the container, and
a second intermediate position, wherein the at least one air or gas inlet bore is located inside the internal volume of the container and the at least one sealing member is still not engaged with the container.

7. The beverage preparation machine according to claim 1, comprising a first locking member for selectively locking/unlocking the container with respect to the at least one container holder when the container is received into the at least one container holder, whereas the at least one container holder is fixed with respect to the at least one fluid processing device, and wherein the at least one movement member comprises a first actuation member for moving the at least one fluid processing device with respect to the container between at least the fluid introduction position and the beverage dispensing position and vice versa.

8. The beverage preparation machine according to claim 7, wherein the first locking member comprises a first gear and/or leverage mechanism which is movable with respect to a fixed portion of the beverage preparation machine and which is provided with at least one tooth selectively engageable with at least one corresponding hole provided in the container, wherein the container is detachable from the at least one container holder, and thus from the beverage preparation machine, in the non-engaged position of the at least one tooth with respect to the at least one corresponding hole.

9. The beverage preparation machine according to claim 7, wherein the first actuation member comprises a second gear and/or leverage mechanism connected to the at least one fluid processing device, wherein the second gear and/or leverage mechanism is configured for moving the at least one fluid processing device with respect to the container along a vertical axis.

10. The beverage preparation machine according to claim 1, wherein the at least one movement member comprises a second actuation member for moving the container with respect to the at least one fluid processing device between the fluid introduction position and the beverage dispensing position and vice versa, whereas the at least one fluid processing device is fixed with respect to the at least one container holder.

11. The beverage preparation machine according to claim 10, wherein the second actuation member comprises a container support device and a third gear and/or leverage mechanism, the container support device being actuated by the third gear and/or leverage mechanism for moving the container with respect to the at least one container holder and with respect to the at least one fluid processing device along a vertical axis.

12. The beverage preparation machine according to claim 11, wherein the container support device is provided with a second locking member comprising at least one pin selectively engageable with at least one corresponding hole provided in the container, wherein the container is detachable from the at least one container holder, and thus from the beverage preparation machine, in the non-engaged position of the at least one pin with respect to the at least one corresponding hole.

13. The beverage preparation machine according to claim 1, wherein the container is manufactured from a flexible material and is internally provided, at the portion thereof that is engaged by the at least one fluid processing device, with an additional layer of a substantially rigid material.

14. The beverage preparation machine according to claim 13, wherein the substantially rigid layer is provided, at the portion of the container that is engaged by the at least one fluid processing device, with a hole having a cross-sectional shape that is compatible with the cross-sectional shape of the fluid processing body, wherein the hole is closed by a predefined portion of the flexible material of the container in a non-operative condition of the at least one fluid processing device, and wherein the hole is opened by the fluid processing body in the fluid introduction position.

15. The beverage preparation machine according to claim 1, wherein in the beverage dispensing position, the fluid substance is simultaneously introduced into the container by the fluid processing body when the beverage product is dispensed from the container.

\* \* \* \* \*